(12) United States Patent
Itaya

(10) Patent No.: US 12,120,276 B2
(45) Date of Patent: Oct. 15, 2024

(54) MANAGEMENT METHOD FOR MANAGING IMAGE FORMING APPARATUS AND MANAGEMENT SERVER FOR MANAGING IMAGE FORMING APPARATUS

(71) Applicant: Konica Minolta, Inc., Tokyo (JP)

(72) Inventor: Shimpei Itaya, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/461,837

(22) Filed: Sep. 6, 2023

(65) Prior Publication Data

US 2024/0098191 A1 Mar. 21, 2024

(30) Foreign Application Priority Data

Sep. 15, 2022 (JP) ................. 2022-147226

(51) Int. Cl.
*H04N 1/00* (2006.01)
*G06F 21/56* (2013.01)

(52) U.S. Cl.
CPC ......... *H04N 1/00344* (2013.01); *G06F 21/56* (2013.01); *H04N 1/00087* (2013.01)

(58) Field of Classification Search
USPC ....................................................... 358/1.15
See application file for complete search history.

(56) References Cited

U.S. PATENT DOCUMENTS

| | | | |
|---|---|---|---|
| 7,256,903 | B2 | 8/2007 | Ando |
| 11,132,149 | B2 | 9/2021 | Matsushima et al. |
| 2017/0019552 | A1* | 1/2017 | Nakamura ......... H04N 1/00344 |
| 2017/0251122 | A1* | 8/2017 | Matsushima ........ H04N 1/4433 |
| 2021/0377417 | A1* | 12/2021 | Nishikawa ............ G06F 3/1232 |

FOREIGN PATENT DOCUMENTS

| | | |
|---|---|---|
| JP | 2003259079 A | 9/2003 |
| WO | 2017150472 A1 | 9/2017 |

* cited by examiner

*Primary Examiner* — Jacky X Zheng
(74) *Attorney, Agent, or Firm* — Buchanan Ingersoll & Rooney PC

(57) ABSTRACT

A management method for managing one or more image forming apparatuses includes: acquiring first information indicating a target region and second information indicating a situation of the target region; specifying a target image forming apparatus installed in the target region in the one or more image forming apparatuses; and outputting, to the target image forming apparatus, a change instruction for changing a setting content of a setting item of the target image forming apparatus to a setting content corresponding to the second information. The second information includes at least one of information regarding a situation of spread of an infectious disease and information regarding electric power supply.

20 Claims, 17 Drawing Sheets

FIG.3

| NAME OF TARGET REGION | INFORMATION REGARDING SITUATION OF SPREAD OF INFECTIOUS DISEASE IN TARGET REGION |
|---|---|
| TOKYO | ISSUANCE OF VIRUS-SPREAD PREVENTION SPECIAL MEASURE |
| OSAKA | LIFT OF VIRUS-SPREAD PREVENTION SPECIAL MEASURE |
| HOKKAIDO | LIFT OF VIRUS-SPREAD PREVENTION SPECIAL MEASURE |
| ⋮ | ⋮ |

| NAME OF TARGET REGION | INFORMATION REGARDING ELECTRIC POWER SUPPLY IN TARGET REGION |
|---|---|
| KANTO | THERE IS RISK IN ELECTRIC POWER SUPPLY IN AFTERNOON |
| KANSAI | NO PROBLEM WITH ELECTRIC POWER SUPPLY |
| CHUBU | NO PROBLEM WITH ELECTRIC POWER SUPPLY |
| TOHOKU | NO PROBLEM WITH ELECTRIC POWER SUPPLY |
| ⋮ | ⋮ |

| INFECTIOUS DISEASE COUNTERMEASURE FUNCTION | FUNCTION OF CHANGING SCREEN LAYOUT OF OPERATION PANEL |
| --- | --- |
| | FUNCTION OF NOTIFYING INFECTION RISK |
| | FUNCTION OF OUTPUTTING WASTE SHEET |
| | AUTHENTICATION FUNCTION |
| ECOLOGICAL FUNCTION | FUNCTION OF CONTROLLING ELECTRIC POWER MODE TO ECOLOGICAL MODE |

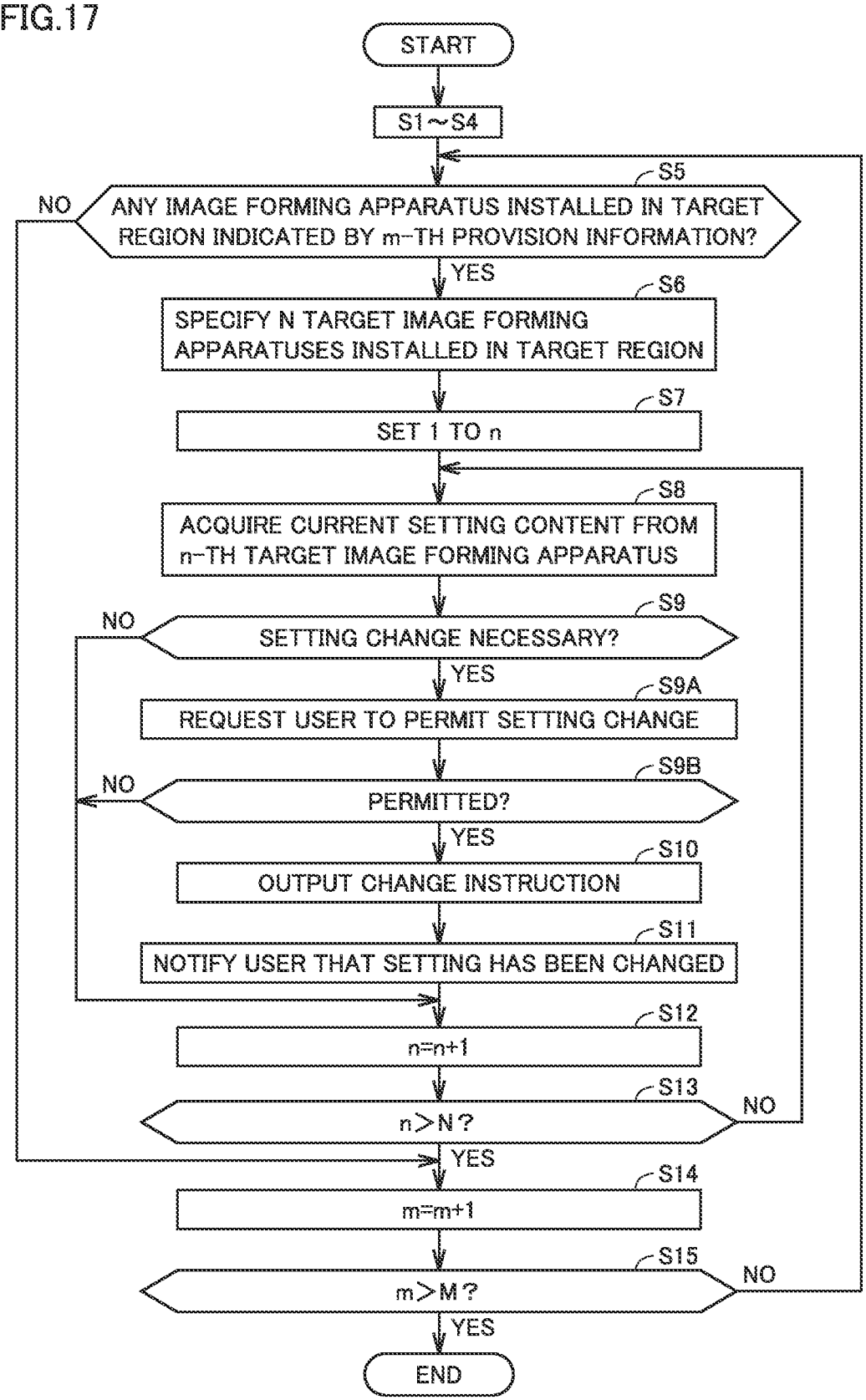

MANAGEMENT METHOD FOR MANAGING IMAGE FORMING APPARATUS AND MANAGEMENT SERVER FOR MANAGING IMAGE FORMING APPARATUS

The entire disclosure of Japanese Patent Application No. 2022-147226, filed on Sep. 15, 2022, is incorporated herein by reference in its entirety.

BACKGROUND

Technological Field

The present disclosure relates to a management method for managing an image forming apparatus and a management server for managing an image forming apparatus.

Description of the Related Art

In the related art, many techniques regarding an image forming apparatus have been developed. For example, Japanese Laid-Open Patent Publication No. 2003-259079 discloses an image forming apparatus that executes predetermined regulation processing in accordance with a copy regulation of a region where the image forming apparatus is installed.

International Publication No. 2017/150472 discloses a technique for introducing, on a web page for introducing applications usable by an image forming apparatus, only applications published in a region where the image forming apparatus is installed.

SUMMARY

In recent years, there has been developed an image forming apparatus equipped with an infectious disease countermeasure function for reducing an infection risk as an infection countermeasure against COVID-19, and an ecological function for reducing electric power consumption. However, if these functions are always turned on, usability for user is deteriorated. Therefore, it is desired to change a setting of the image forming apparatus in accordance with a situation of a region by, for example, switching on only when these functions are necessary; however, the operation of changing the setting is troublesome for the user.

An object of the present disclosure is to reduce time and effort for a user to change a setting of an image forming apparatus in accordance with a situation of a region.

To achieve at least one of the abovementioned objects, according to an aspect of the present invention, a management method reflecting one aspect of the present invention is a management method for managing one or more image forming apparatuses. The management method includes: acquiring first information indicating a target region and second information indicating a situation of the target region; specifying a target image forming apparatus installed in the target region in the one or more image forming apparatuses; and outputting, to the target image forming apparatus, a change instruction for changing a setting content of a setting item of the target image forming apparatus to a setting content corresponding to the second information. The second information includes at least one of information regarding a situation of spread of an infectious disease and information regarding electric power supply.

To achieve at least one of the abovementioned objects, according to an aspect of the present invention, a management server reflecting one aspect of the present invention manages one or more image forming apparatuses. The management server includes: a storage that stores a plurality of instructions; and a processor that executes the plurality of instructions. When executed by the processor, the plurality of instructions cause the processor to perform: acquiring first information indicating a target region and second information indicating a situation of the target region; specifying a target image forming apparatus installed in the target region in the one or more image forming apparatuses; and outputting, to the target image forming apparatus, a change instruction for changing a setting content of a setting item of the target image forming apparatus to a setting content corresponding to the second information. The second information includes at least one of information regarding a situation of spread of an infectious disease and information regarding electric power supply.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a diagram illustrating an example of a first table.

FIG. 4 is a diagram illustrating an example of a second table.

FIG. 6 is a diagram for explaining an infectious disease countermeasure function and an ecological function of the image forming apparatus.

FIG. 17 is a flowchart illustrating a sequence of the setting change processing by the management server according to the second embodiment.

DETAILED DESCRIPTION OF EMBODIMENTS

Figure 1:
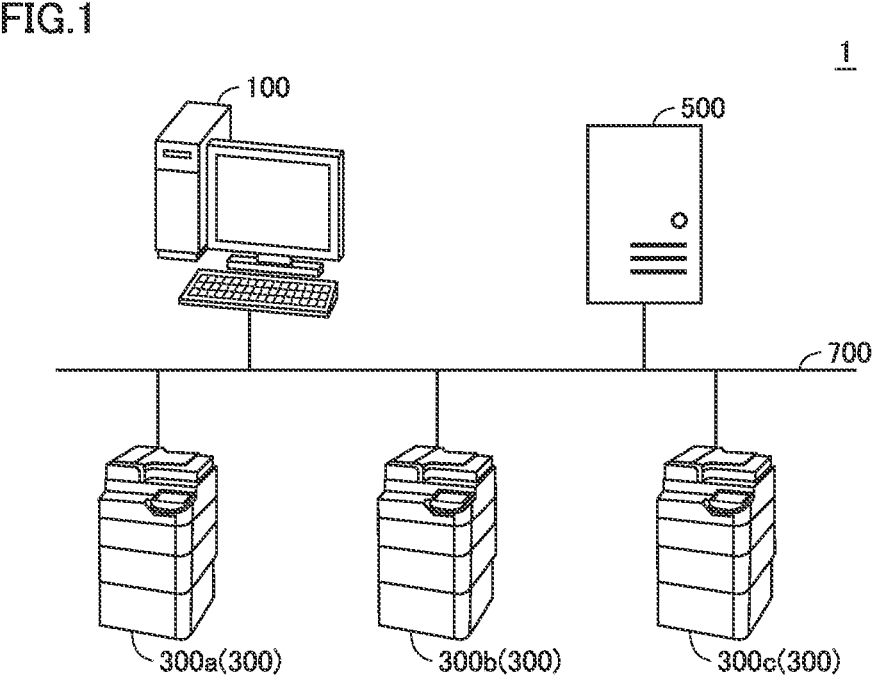
FIG. 1 is a diagram illustrating a management system according to a first embodiment.

Hereinafter, one or more embodiments of the present invention will be described with reference to the drawings. However, the scope of the invention is not limited to the disclosed embodiments.

Hereinafter, embodiments and modification examples according to the present disclosure will be described with reference to the drawings. In the following description, the same parts and constituent elements are denoted by the same reference numerals. Their names and functions are also the same. Therefore, detailed description thereof will not be repeated. Note that the embodiments and modification examples described below may be selectively combined as appropriate.

First Embodiment

<A. Management System>

A configuration of a management system according to a first embodiment will be described with reference to FIGS. 1 to 6. FIG. 1 is a diagram illustrating a management system according to the first embodiment.

The management system 1 according to the first embodiment includes a management server 100, one or more image forming apparatuses, and a distribution server 500. In an example illustrated in FIG. 1, the management system 1 includes an image forming apparatus 300a, an image forming apparatus 300b, and an image forming apparatus 300c as one or more image forming apparatuses. In the following description, the image forming apparatus 300a, the image forming apparatus 300b, and the image forming apparatus 300c will be collectively referred to as an "image forming apparatus 300" when they are not distinguished from each other. The image forming apparatus 300 has an infectious disease countermeasure function and an ecological function.

The management server 100, the image forming apparatus 300, and the distribution server 500 are configured to communicate with each other via a network 700. The management server 100 manages the one or more image forming apparatuses. The distribution server 500 distributes provision information provided from at least one of a municipality and a company. The provision information includes first information indicating a target region and second information indicating a situation of the target region.

The target region includes at least one of a range including a plurality of countries, a country, a prefecture, an area, a city, town or village, an electric-power-supply-unit-based region, and a school-district-based region. The first information is, for example, the name of the region. The second information includes at least one of information regarding a situation of spread of an infectious disease and information regarding electric power supply. More specifically, the information regarding the situation of spread of the infectious disease indicates whether or not an infection risk is high. The information regarding the electric power supply indicates whether or not there is a risk in the electric power supply, that is, whether or not electric power is in short.

A form of distribution of the information by the distribution server 500 may be any of distribution by electronic mail and notification to an application having downloaded to the management server 100 in advance. The application is an application for receiving provision information distributed from the distribution server 500. The application is provided from at least one of the municipality and the company that provide the provision information.

Upon receiving the provision information, the management server 100 specifies a target image forming apparatus installed in a target region in the one or more image forming apparatuses. The management server 100 outputs to the target image forming apparatus a change instruction for changing a setting content of a setting item of the target image forming apparatus to a setting content corresponding to the second information.

More specifically, when the second information is the information regarding the situation of spread of the infectious disease, the management server 100 outputs, to the target image forming apparatus, a change instruction for changing a setting content of an item regarding the infectious disease countermeasure function of the target image forming apparatus to a setting content corresponding to the second information. When the second information is the information regarding the electric power supply, the management server 100 outputs, to the target image forming apparatus, a change instruction for changing a setting content of an item regarding the ecological function of the target image forming apparatus to a setting content corresponding to the second information.

Accordingly, the setting content of the setting item of the target image forming apparatus is changed to the setting content corresponding to the second information.

Note that the management system 1 may include a plurality of management servers. In such a case, the plurality of management servers manage different image forming apparatuses respectively. For example, a first management server manages an image forming apparatus installed in a region A, and a second management server manages an image forming apparatus installed in a region B.

Further, the distribution server 500 may distribute provision information for a whole country or may distribute provision information for the whole world. Further, the distribution server 500 may distribute provision information for a specific region.

Furthermore, the management system 1 may include a plurality of distribution servers. In that case, the plurality of distribution servers may distribute respective pieces of provision information different from each other in region, may distribute respective pieces of provision information different from each other in type, or may distribute respective pieces of provision information different from each other in at least one of region and type.

As an example of a case where the plurality of distribution servers distribute the respective piece of provision information different from each other in region, a first distribution server distributes provision information for a region A, and a second distribution server distributes provision information for a region B.

As an example of a case where the plurality of distribution servers distribute the respective pieces of provision information different from each other in type, a first distribution server distributes information regarding a situation of spread of an infectious disease, and the second distribution server distributes information regarding electric power supply.

As an example of a case where the plurality of distribution servers distribute the respective pieces of provision information different from each other in at least one of region and type, a first distribution server distributes information regarding a situation of spread of an infectious disease in a region A, a second distribution server distributes information regarding electric power supply in the region A, a third distribution server distributes information regarding a situation of spread of the infectious disease in a region B, and a fourth distribution server distributes information regarding electric power supply in the region B.

Figure 2:
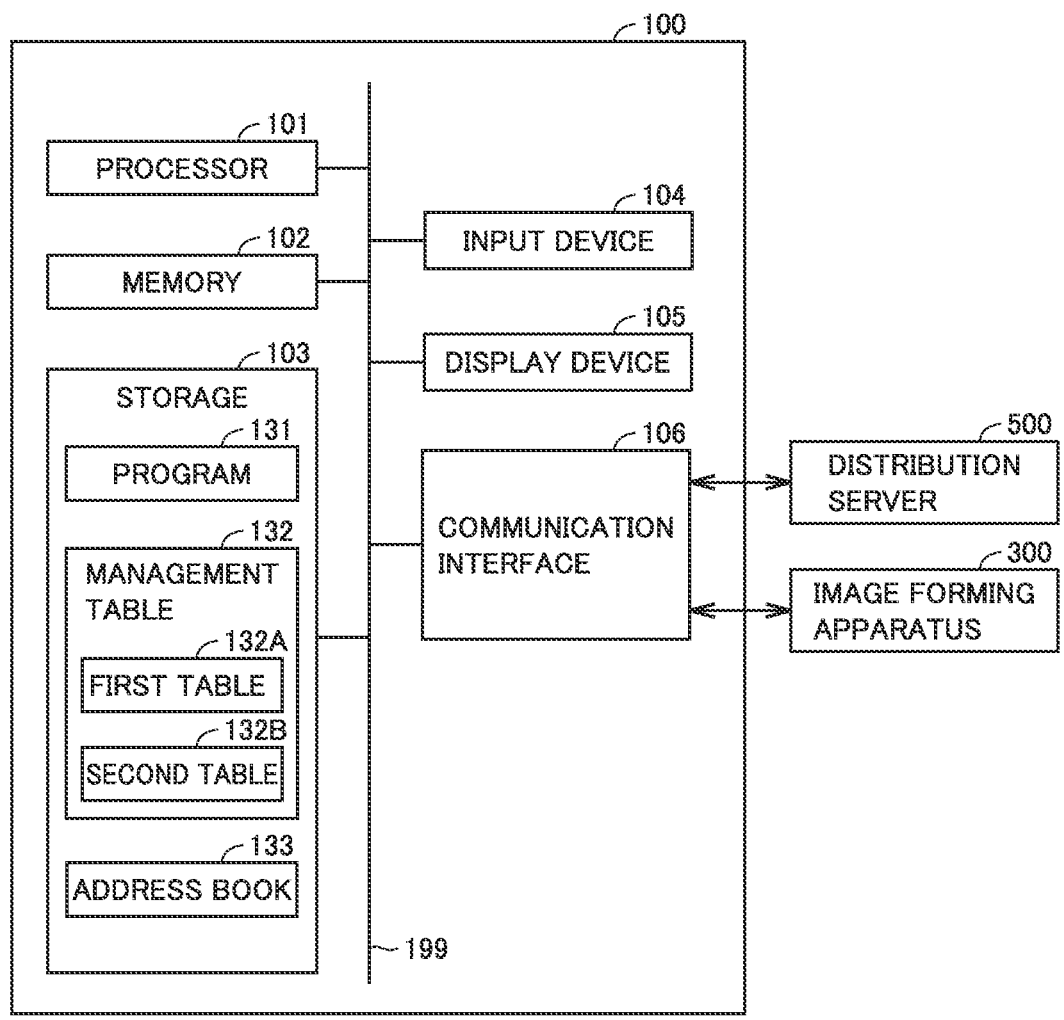
FIG. 2 is a diagram illustrating a hardware configuration of a management server in the first embodiment.

FIG. 2 is a diagram illustrating the hardware configuration of the management server in the first embodiment. The management server 100 includes a processor 101, a memory 102, a storage 103, an input device 104, a display device 105, and a communication interface 106. The processor 101, the memory 102, the storage 103, the input device 104, the display device 105, and the communication interface 106 are connected by a bus 199.

The processor 101 is constituted of, for example, a central processing unit (CPU), a micro-processing unit (MPU), or the like. The memory 102 is constituted of, for example, a volatile storage device such as a dynamic random access memory (DRAM) or a static random access memory (SRAM). The storage 103 is constituted of a nonvolatile storage device such as a hard disk drive (HDD), a solid state drive (SSD), or a flash memory.

The storage 103 stores a program 131, a management table 132, and an address book 133. The program 131 includes a plurality of computer-readable instructions for controlling the management server 100. The processor 101 controls each section of the management server 100 by executing the program 131.

The program 131 may be installed from a storage medium such as a memory card into the management server 100, or may be downloaded from a predetermined server provided on a network and may be installed into the management server 100.

The program 131 may be provided not as a single program but may be provided to be incorporated in a part of an arbitrary program. In this case, processing according to the present embodiment is realized in cooperation with the arbitrary program. Such a program that does not include part of the modules does not depart from the gist of management server 100 according to the present embodiment. A part or whole of the functions provided by the program 131 may be realized by dedicated hardware.

The management table 132 is a table for managing the provision information. The management table 132 includes a first table 132A and a second table 132B.

Now, with reference to FIGS. 3 and 4, the management table 132 will be described. FIG. 3 is a diagram illustrating an example of the first table. FIG. 4 is a diagram illustrating an example of the second table.

The first table 132A is a table for managing the information regarding the situation of spread of the infectious disease for each target region. The first table 132A includes the "name of the target region" as the first information and includes the "information regarding the situation of spread of the infectious disease in the target region" as the second information. In the first table 132A, one record is constituted of the "name of the target region" and the "information regarding the situation of spread of the infectious disease in the target region".

The second table 132B is a table for managing the information regarding the electric power supply for each target region. The second table 132B includes the "name of the target region" as the first information and includes the "information regarding the electric power supply in the target region" as the second information. In the second table 132B, one record is constituted of the "name of the target region" and the "information regarding the electric power supply in the target region".

When newly acquired second information is the information regarding the situation of spread of the infectious disease, the processor 101 updates the first table 132A. When the newly acquired second information is the information regarding the electric power supply, the processor 101 updates the second table 132B.

Referring again to FIG. 2, address book 133 includes an electronic mail address of an administrator of each of the one or more image forming apparatuses (for example, image forming apparatus 300a, image forming apparatus 300b, and image forming apparatus 300c).

The input device 104 (e.g., a mouse, a keyboard, a touch sensor, or the like) receives a user operation and outputs, to the processor 101, an operation signal corresponding to the operation. The display device 105 (e.g., a display) displays various types of information such as an operation status of the management server 100 and a processing result.

The communication interface 106 transmits and receives information to and from each of apparatuses (e.g., the distribution server 500 and the image forming apparatus 300) connected to the network 700. In an aspect, the processor 101 receives the provision information from the distribution server 500 via the communication interface 106. In another aspect, the processor 101 transmits the setting change instruction to the image forming apparatus 300 via the communication interface 106.

Figure 5:
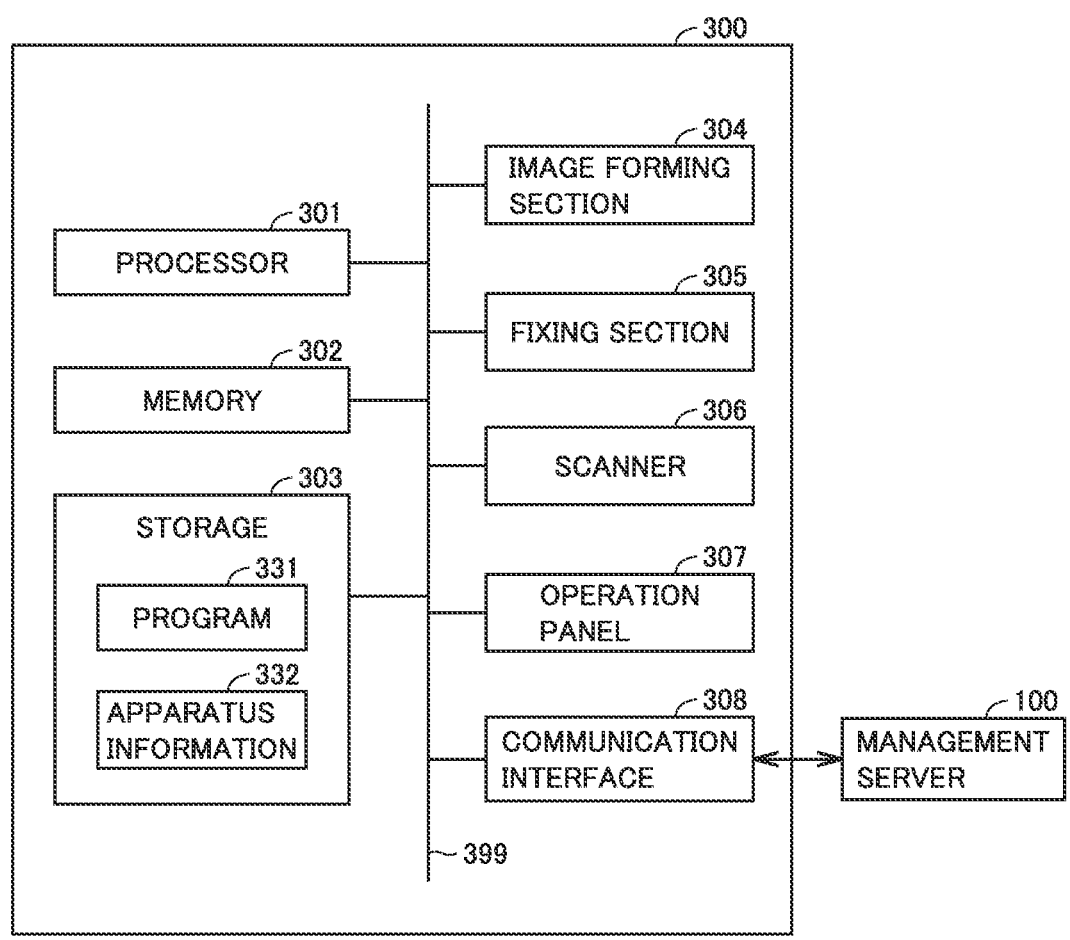
FIG. 5 is a diagram illustrating an example of a hardware configuration of an image forming apparatus according to the first embodiment.

FIG. 5 is a diagram illustrating an example of a hardware configuration of the image forming apparatus according to the first embodiment. The image forming apparatus 300 includes a processor 301, a memory 302, a storage 303, an image forming section 304, a fixing section 305, a scanner 306, an operation panel 307, and a communication interface 308. The processor 301, the memory 302, the storage 303, the image forming section 304, the fixing section 305, the scanner 306, the operation panel 307, and the communication interface 308 are connected by a bus 399.

The processor 301 is constituted of, for example, a central processing unit (CPU) and a micro processing unit (MPU). The memory 302 is constituted of a volatile storage device such as a DRAM or an SRAM. The storage 303 is, for example, a nonvolatile storage such as an HDD, an SSD, or a flash memory.

The storage 303 stores a program 331 and apparatus information 332. Program 331 includes a plurality of computer-readable instructions for controlling image forming apparatus 300.

The program 331 may be provided not as a single program but may be provided to be incorporated in a part of an arbitrary program. In this case, processing according to the present embodiment is realized in cooperation with the arbitrary program. Such a program that does not include part of the modules does not depart from the gist of image forming apparatus 300 according to the present embodiment. A part or whole of the functions provided by the program 331 may be realized by dedicated hardware.

Processor 301 controls each section of image forming apparatus 300 by executing the program 331. For example, the processor 301 operates the image forming section 304, a conveyance roller, and the fixing section 305 based on image data so as to form an image on a sheet. The image data may be image data generated by the scanner 306 or image data received from an apparatus that can communicate with the image forming apparatus 300.

Apparatus information 332 indicates a place where the image forming apparatus 300 is installed. More specifically, the apparatus information 332 includes at least one of destination information of the image forming apparatus 300, place information indicating the installation place of the image forming apparatus 300, network information of the image forming apparatus 300, and physical location information of the image forming apparatus 300.

The destination information indicates a shipping destination of the image forming apparatus 300 (for example, a country where the image forming apparatus 300 is shipped, a region where the image forming apparatus 300 is shipped, or the like).

The place information and the network information are input to the image forming apparatus 300 by a serviceman or an administrator at the time of installation of the image forming apparatus 300. The place information may be the name of the region where the image forming apparatus 300 is installed (e.g., a country name, a prefecture name, an area name, and/or a city, town or village name), or may be an address, a postal number, and/or a phone number of the installation place of the image forming apparatus 300. Furthermore, the place information may be the latitude and longitude of the installation place of the image forming apparatus 300. The network information is, for example, the Internet protocol (IP) address of the image forming apparatus 300.

When the image forming apparatus 300 has a global positioning system (GPS) function, the physical location information is acquired by the function.

The image forming section 304 forms an image by applying loner (color material) to a sheet supplied from a sheet feed tray. The image forming section 304 includes an intermediate transfer belt, image forming units, and a transfer roller. The intermediate transfer belt is an endless belt-like member that is provided around a plurality of rollers and is moved to rotate. The image forming units are arranged along the intermediate transfer belt, and form respective toner images of Y (yellow) color, M (magenta) color, C (cyan) color, and K (black) color on the intermediate transfer belt based on image data. When a sheet passes through a nip portion formed between the intermediate transfer belt and the transfer roller, the toner image is transferred to the sheet and an image is formed.

The fixing section 305 heats and presses the sheet to which the toner image has been transferred, thereby fixing the toner image on the sheet. The sheet on which the toner image has been fixed is conveyed by a conveyance roller and is ejected to a sheet ejection tray.

The scanner 306 includes an optical system, such as a light source and a reflecting mirror, and an imaging element, and reads an image of a sheet conveyed through a predetermined conveyance path or a sheet placed on platen glass to generate image data in a bitmap format.

The operation panel 307 includes a display device such as a liquid crystal display, and an input device such as a touch screen disposed on a screen of the display device. The operation panel 307 displays various information such as an operation status of the image forming apparatus 300 and a processing result, converts an input operation into a signal, and outputs the signal to the processor 301.

The communication interface 308 transmits and receives information to and from each of apparatuses (e.g., the management server 100) connected to the network 700. In an aspect, the processor 301 receives the setting change instruction from the management server 100 via the communication interface 308.

FIG. 6 is a diagram for explaining the infectious disease countermeasure function and the ecological function of the image forming apparatus. The infectious disease countermeasure function is a function for reducing an infection risk. For example, the infectious disease countermeasure function includes at least one of a function of changing a screen layout of the operation panel 307, a function of notifying the infection risk, a function of outputting a waste sheet, and an authentication function.

The function of changing the screen layout of the operation panel 307 is a function of changing the layout of icons and software keys in the operation panel 307. Thus, an operation can be performed without touching a portion of the operation panel 307 touched by another person. Therefore, when the function of changing the screen layout of the operation panel 307 is on, the infection risk is reduced. On the other hand, when the function of changing the screen layout of the operation panel 307 is on, the screen layout of the operation panel 307 is changed every time a user uses the operation panel 307. Therefore, when the function of changing the screen layout of the operation panel 307 is always on, usability for user is deteriorated.

The function of notifying the infection risk includes, for example, at least one of a function of notifying a place touched by another person, a function of notifying that a person having a fever or a person who coughed or sneezed was near the apparatus or an output material, a function of notifying that the apparatus or the output material may be contaminated, and a function of notifying the information regarding the situation of spread of the infectious disease in the region where the image forming apparatus 300 is installed.

The function of notifying a place touched by another person is a function of specifying and notifying a place (e.g., the sheet feed tray or the operation panel 307) touched by another person. For example, by providing image forming apparatus 300 with a sensor that detects contact, it is possible to specify a place touched by a person.

The function of notifying that a person having a fever or a person who coughed or sneezed was near the apparatus or an output material is a function of notifying, when a person having a fever was near the image forming apparatus 300 or the output material or when a person who coughed or sneezed was near the image forming apparatus 300 or the output material, that such a person was present. For example, by providing the image forming apparatus 300 with a non-contact temperature sensor, it is possible to determine whether or not a person having a fever was near the image forming apparatus 300 or the output material. Furthermore, by providing the image forming apparatus 300 with at least one of a camera and a microphone, it is possible to determine whether or not a person who coughed or sneezed was near the image forming apparatus 300 or the output material.

The function of notifying that the apparatus or the output material may be contaminated is a function of determining and notifying that the apparatus or the output material may be contaminated, when a person having a fever or a person who coughed or sneezed was near the apparatus or the output material.

The function of notifying the information regarding the situation of spread of the infectious disease in the region where the image forming apparatus 300 is installed is a function of acquiring the information from the management server 100 and notifying the information.

As a method of notifying the infection risk, for example, there is a method of displaying the infection risk on the operation panel 307. When the image forming apparatus 300 includes a speaker, the infection risk may be notified by sound. When the function of notifying the infection risk is on, the user's attention to the infection risk is attracted, and thus the infection risk is reduced. On the other hand, when the function of notifying the infection risk is on, the user may be unwilling to use the operation panel 307 or a sound emitted from the speaker may be annoying. Therefore, when the function of notifying the infection risk is always on, usability for user is deteriorated.

The function of outputting a waste sheet is a function of outputting one extra sheet as a waste sheet when the output material may be contaminated. With the output of the waste sheet, a user can discard such a possibly contaminated output material without directly touching the output material. Therefore, when the function of outputting the waste paper is on, the infection risk is reduced. On the other hand, when the function of outputting the waste sheet is on, since a consumption amount of sheets increases due to the output of the waste sheet, a cost burden on the user increases and the number of times of sheet replacement increases. Therefore, when the function of outputting the waste sheet is always on, usability for user is deteriorated.

The authentication function is a function of limiting the use of the image forming apparatus 300 to a user having a predetermined attribute or limiting the number of users of the image forming apparatus 300 to a predetermined number. When the authentication function is on, the infection risk is reduced because the number of users who operate the operation panel 307 is limited. On the other hand, when the authentication function is on, users who can use the image forming apparatus 300 are limited. Therefore, when the authentication function is always on, usability for user is deteriorated.

The ecological function is a function for reducing electric power consumption. An electric power mode of the image forming apparatus 300 includes a standard mode and an ecological mode in which electric power consumption is lower than in the standard mode. The ecological function is a function of controlling the electric power mode to the ecological mode. When the ecological function is on, the electric power consumption is reduced, but a time until the image forming apparatus 300 returns to the usable state becomes long. Therefore, when the ecological function is always on, usability for user is deteriorated.

<B. Setting Change Processing>

Figure 7:
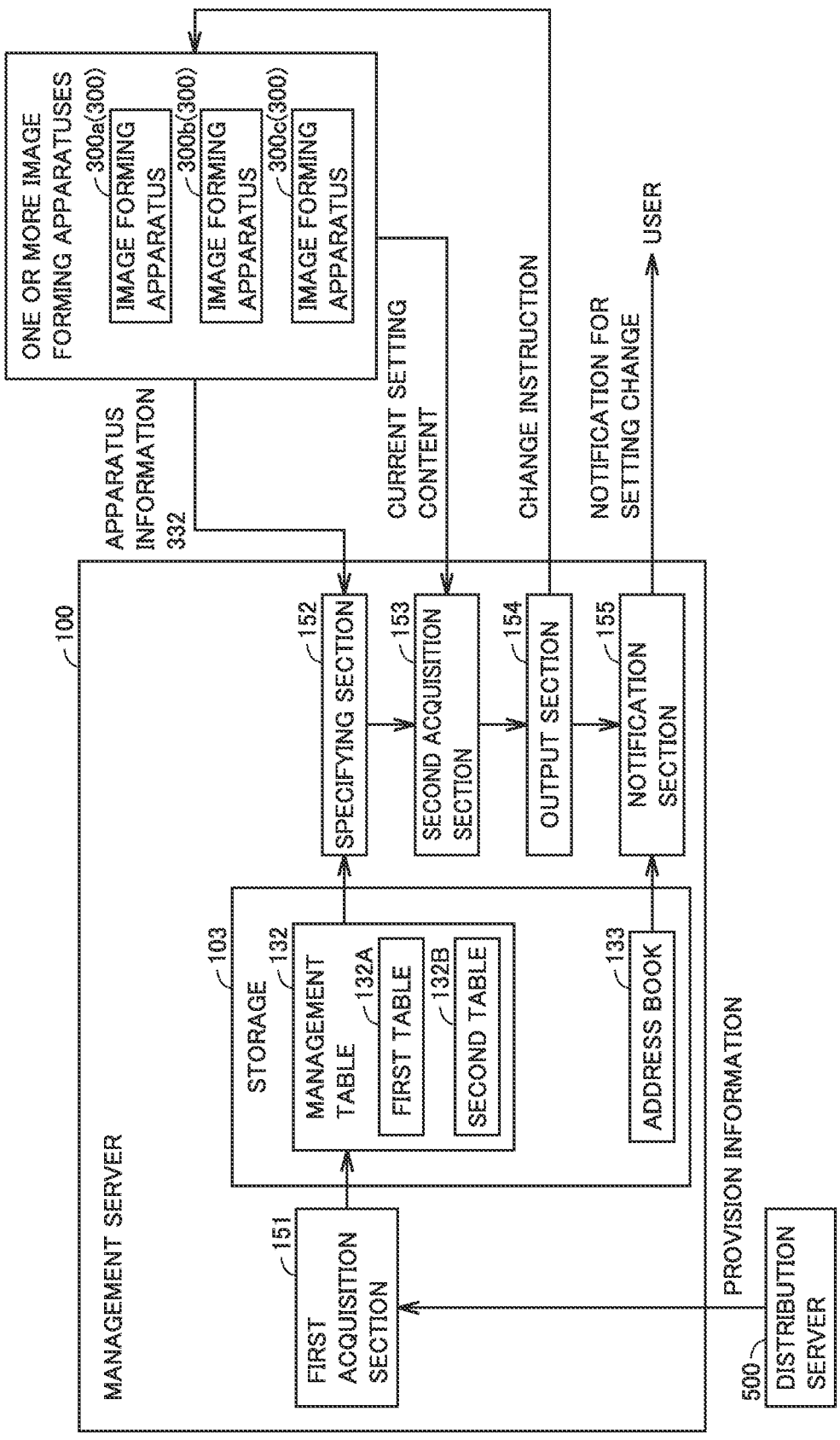
FIG. 7 is a diagram for explaining an overview of setting change processing performed by the management server according to the first embodiment.

Referring to FIGS. 7 to 14, the setting change processing by the management server 100 will be described. FIG. 7 is a diagram for explaining an overview of the setting change processing performed by the management server according to the first embodiment.

The management server 100 includes a first acquisition section 151, storage 103, a specifying section 152, a second acquisition section 153, an output section 154, and a notification section 155. The first acquisition section 151, the specifying section 152, the second acquisition section 153, the output section 154, and the notification section 155 are realized by the processor 101 executing the program 131.

The first acquisition section 151 acquires the first information and the second information. As an example, the first acquisition section 151 specifies the first information and the second information by analyzing the provision information provided from at least one of the municipality and the company. More specifically, the first acquisition section 151 searches in the provision information distributed from the distribution server 500 using a predetermined search keyword, and specifies the first information and the second information based on the hit search keyword.

The search keyword for specifying the first information is, for example, the name of the region. Note that when a different company or municipality transmits the provision information for each region, as the search keyword for specifying the first information, instead of the name of the region, the name of the municipality that transmits the provision information may be used, or the name of the company (e.g., electric power company or the like) that transmits the provision information may be used.

The search keyword for specifying the information regarding the situation of spread of the infectious disease in the second information include, for example, "virus-spread prevention special measure", "issued", "lifted", "virus-infected person", and "emerge". When "virus-spread prevention special measure" and "issued" are hit by the search, the first acquisition section 151 specifies "information indicating that the virus-spread prevention special measure has been issued" as the second information. When "virus-spread prevention special measure" and "lifted" are hit by the search, the first acquisition section 151 specifies "information indicating that the virus-spread prevention special measure has been lifted" as the second information. When "virus-infected person" and "emerge" are hit by the search, the first acquisition section 151 specifies "information indicating that a virus-infected person has emerged" as the second information.

The search keyword for specifying the information regarding the electric power supply in the second information includes, for example, "electric power supply", "shortage", "risk", "no problem", "electric power consumption suppression", "cooperation request", "issued", and "lifted". When "electric power supply" and "shortage" are hit or "electric power supply" and "risk" are hit in the search, the first acquisition section 151 specifies "information that there is a risk in electric power supply" as the second information. When "electric power consumption suppression", "cooperation request", and "issued" are hit by the search, the first acquisition section 151 specifies "information indicating that a cooperation request for electric power consumption suppression has been issued" as the second information. When "electric power supply" and "no problem" are hit by the search, the first acquisition section 151 specifies "information indicating that there is no problem with electric power supply" as the second information. When "electric power consumption suppression", "cooperation request", and "lifted" are hit by the search, the first acquisition section 151 specifies "information that the cooperation request for electric power consumption suppression has been lifted" as the second information.

The first acquisition section 151 updates the management table 132 based on the first information and the second information. When the second information is the information regarding the situation of spread of the infectious disease, the first acquisition section 151 updates the first table 132A. For example, when the first acquisition section 151 acquires the information regarding the situation of spread of the infectious disease in Tokyo for the first time, the first acquisition section 151 adds a record to the first table 132A and registers the information regarding the situation of spread of the infectious disease in Tokyo in the record. The first acquisition section 151 updates the information in the record when the information regarding the situation of spread of the infectious disease in Tokyo is acquired again.

When the second information is the information regarding the electric power supply, the first acquisition section 151 updates the second table 132B. In one example, when the first acquisition section 151 acquires the information regarding the electric power supply in Kanto for the first time, the first acquisition section 151 adds a record to the second table 132B and registers the information regarding the electric power supply in Kanto in the record. The first acquisition section 151 updates the information in the record when the information regarding the electric power supply in Kanto is acquired again.

The specifying section 152 specifies a target image forming apparatus installed in the target region indicated by the first information in the one or more image forming apparatuses. More specifically, first, the specifying section 152 acquires apparatus information 332 from each of the one or more image forming apparatuses. Next, the specifying section 152 specifies the installation place of each image forming apparatus from the apparatus information 332. Finally, the specifying section 152 specifies the image forming apparatus whose installation place is included in the target region indicated by the first information as the target image forming apparatus. Therefore, there may be only one target image forming apparatus, or there may be a plurality of target image forming apparatuses. Furthermore, in some cases, no target image forming apparatus exists.

The second acquisition section 153 acquires a current setting content of a setting item from the target image forming apparatus. More specifically, when the second information is the information regarding the situation of spread of the infectious disease, the second acquisition section 153 acquires a current setting content of an item regarding the infectious disease countermeasure function from the target image forming apparatus. When the second information is the information regarding the electric power supply, the second acquisition section 153 acquires a current setting content of an item regarding the ecological function from the target image forming apparatus.

The output section 154 outputs to the target image forming apparatus a change instruction for changing the setting content of the setting item of the target image forming apparatus to the setting content corresponding to the second information. More specifically, when the current setting content of the setting item of the target image forming apparatus is different from the setting content corresponding to the second information, the output section 154 outputs, to the target image forming apparatus, a change instruction for changing the setting content of the setting item to the setting content corresponding to the second information.

When the second information indicates that the infection risk is high, the setting content corresponding to the second information is to set the infectious disease countermeasure function to on. When the second information indicates that the infection risk is low, the setting content corresponding to the second information is to set the infectious disease countermeasure function to off.

When the second information indicates that there is a risk in the electric power supply, the setting content corresponding to the second information is to set the ecological function to on. When the second information indicates that there is no risk in the electric power supply, the setting content corresponding to the second information is to set the ecological function to off.

As an example, when the second information indicates that the infection risk is high and the infectious disease countermeasure function is off in the target image forming apparatus, the output section 154 outputs, to the target image forming apparatus, a change instruction for changing the infectious disease countermeasure function to on.

As another example, when the second information indicates that the infection risk is low and the infectious disease countermeasure function is on in the target image forming apparatus, the output section 154 outputs, to the target image forming apparatus, a change instruction for changing the infectious disease countermeasure function to off.

As another example, when the second information indicates that there is a risk in the electric power supply and the ecological function is off in the target image forming apparatus, the output section 154 outputs, to the target image forming apparatus, a change instruction for changing the ecological function to on.

As another example, when the second information indicates that there is no risk in the electric power supply and the ecological function is on in the target image forming apparatus, the output section 154 outputs, to the target image forming apparatus, a change instruction for changing the ecological function to off.

The notification section 155 notifies the user that the setting of the target image forming apparatus has been changed. More specifically, first, the notification section 155 acquires the electronic mail address of the administrator of the target image forming apparatus from the address book 133. Subsequently, the notification section 155 transmits, to the electronic mail address, an electronic mail indicating that the setting content of the setting item of the target image forming apparatus has been changed to the setting content corresponding to the second information.

Figure 8:
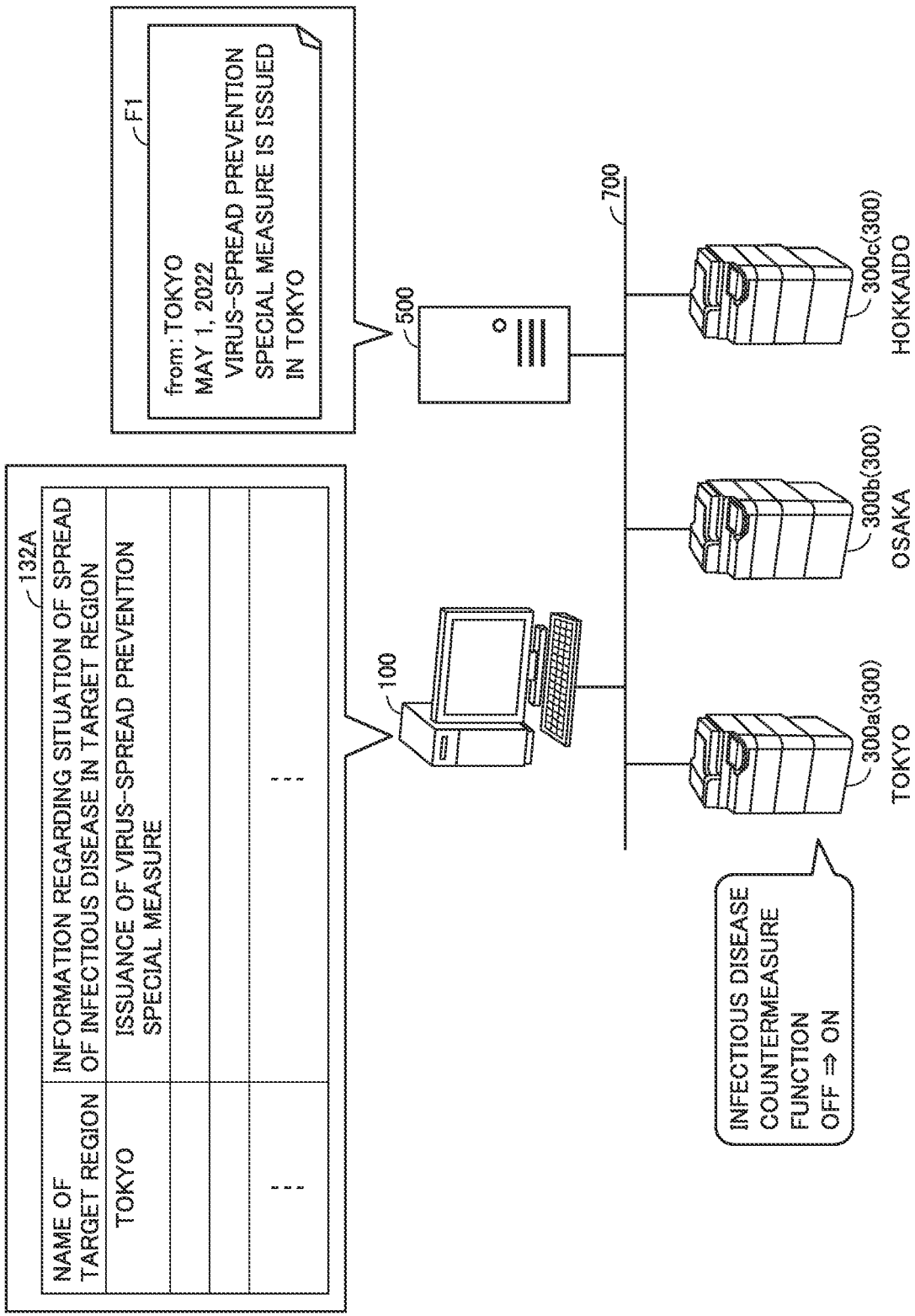
FIG. 8 is a diagram illustrating an example of the setting change processing performed by the management server when information regarding a situation of spread of an infectious disease is distributed from a distribution server.

FIG. 8 is a diagram illustrating an example of the setting change processing performed by the management server when the information regarding the situation of spread of the infectious disease is distributed from the distribution server.

In the example shown in FIG. 8, the image forming apparatus 300a is installed in Tokyo, the image forming apparatus 300b is installed in Osaka, and the image forming apparatus 300c is installed in Hokkaido. Furthermore, in the example illustrated in FIG. 8, the infectious disease countermeasure function of the image forming apparatus 300a is set to off. Further, provision information F1 indicates that the virus-spread prevention special measure has been issued in Tokyo.

When the provision information F1 is distributed from the distribution server 500, the management server 100 receives the provision information F1 and searches in the provision information F1 using a predetermined search keyword. Thus, from the provision information F1, the management server 100 specifies "Tokyo" as the first information and "issuance of virus-spread prevention special measure" as the second information. The information indicating that the virus-spread prevention special measure has been issued is an example of the information indicating that the infection risk is high.

Next, the management server 100 updates the first table 132A based on the provision information F1. To be more specific, the management server 100 updates the "information regarding the situation of spread of the infectious disease" in "Tokyo" in the first table 132A to "issuance of virus-spread prevention special measure". When the record of "Tokyo" does not exist in the first table 132A, the management server 100 adds a record of "Tokyo" and registers "issuance of virus-spread prevention special measure" in the record.

Next, the management server 100 acquires the apparatus information 332 from each of the image forming apparatus 300a, the image forming apparatus 300b, and the image forming apparatus 300c, and specifies the installation place of each image forming apparatus.

Next, the management server 100 specifies, as the target image forming apparatus, the image forming apparatus 300a installed in the target region (i.e., Tokyo) indicated by the provision information F1. Next, the management server 100 acquires the current setting content of the infectious disease countermeasure function of the image forming apparatus 300a.

Since the provision information F1 indicates that the virus-spread prevention special measure has been issued in Tokyo, it is preferable that the infectious disease countermeasure function of the image forming apparatus installed in Tokyo be set to on. However, the infectious disease countermeasure function of the image forming apparatus 300a is set to off. That is, the current setting content of the image forming apparatus 300a is different from the setting content corresponding to the second information included in the provision information F1. Therefore, the management server 100 determines that it is necessary to change the setting of the infectious disease countermeasure function of the image forming apparatus 300a.

Management server 100 outputs, to image forming apparatus 300a, a change instruction for changing the infectious disease countermeasure function to on. Thus, the infectious disease countermeasure function of the image forming apparatus 300a is changed to on.

Next, the management server 100 notifies the administrator of the image forming apparatus 300a that the infectious disease countermeasure function of the image forming apparatus 300a has been changed to on. To be more specific, the management server 100 acquires the electronic mail address of the administrator of the image forming apparatus 300a from the address book 133, and transmits, to the electronic mail address, an electronic mail notifying the setting change.

In FIG. 8, the information indicating that the virus-spread prevention special measure has been issued has been exemplified as an example of the information indicating that the infection risk is high, but the information indicating that the infection risk is high is not limited thereto. The information indicating that the infection risk is high may be, for example, information indicating that a virus-infected person has emerged or information indicating that the number of virus-infected persons exceeds a predetermined number.

Figure 9:
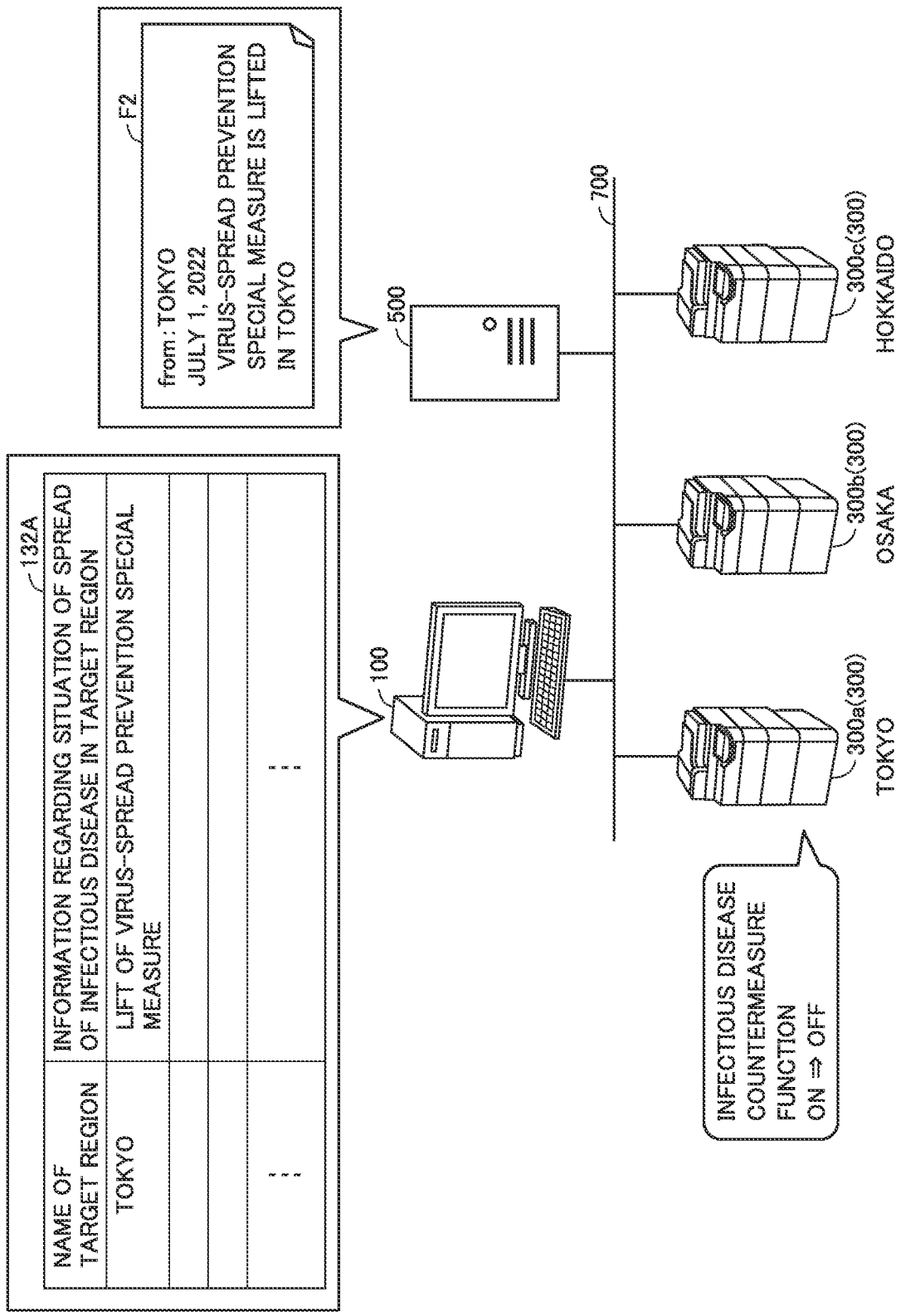
FIG. 9 is a diagram illustrating another example of the setting change processing performed by the management server when the information regarding the situation of spread of the infectious disease is distributed from the distribution server.

FIG. 9 is a diagram illustrating another example of the setting change processing performed by the management server when the information regarding the situation of spread of the infectious disease is distributed from the distribution server.

In the example shown in FIG. 9, the image forming apparatus 300a is installed in Tokyo, the image forming apparatus 300b is installed in Osaka, and the image forming apparatus 300c is installed in Hokkaido. Furthermore, in the example illustrated in FIG. 9, the infectious disease countermeasure function of the image forming apparatus 300a is set to on. In addition, the provision information F2 indicates that the virus-spread prevention special measure has been lifted in Tokyo.

When provision information F2 is distributed from the distribution server 500, the management server 100 receives the provision information F2 and searches in the provision information F2 using a predetermined search keyword. Thus, from the provision information F2, the management server 100 specifies "Tokyo" as the first information and "lift of virus-spread prevention special measure" as the second information. The information that the virus-spread prevention special measure has been lifted is an example of the information indicating that the infection risk is low.

Next, the management server 100 updates the first table 132A based on the provision information F2. To be more specific, the management server 100 updates the "information regarding the situation of spread of the infectious disease" in "Tokyo" in the first table 132A to "lift of virus-spread prevention special measure".

Next, the management server 100 acquires apparatus information 332 from each of the image forming apparatus 300a, the image forming apparatus 300b, and the image forming apparatus 300c, and specifies the installation place of each image forming apparatus.

Next, the management server 100 specifies, as the target image forming apparatus, the image forming apparatus 300a installed in the target region (i.e., Tokyo) indicated by the provision information F2. Next, the management server 100 acquires the current setting content of the infectious disease countermeasure function of the image forming apparatus 300a.

Since the provision information F2 indicates that the virus-spread prevention special measure has been lifted in Tokyo, it is preferable that the infectious disease countermeasure function of the image forming apparatus installed in Tokyo be set to off in favor of usability for user. However, the infectious disease countermeasure function of the image forming apparatus 300a is set to on. That is, the current setting content of the image forming apparatus 300a is different from the setting content corresponding to the second information included in the provision information F2. Therefore, the management server 100 determines that it is necessary to change the setting of the infectious disease countermeasure function of the image forming apparatus 300a.

Management server 100 outputs, to image forming apparatus 300a, a change instruction for changing the infectious disease countermeasure function to off. Thus, the infectious disease countermeasure function of the image forming apparatus 300a is changed to off.

Next, the management server 100 notifies the administrator of the image forming apparatus 300a that the infectious disease countermeasure function of the image forming apparatus 300a has been changed to off. To be more specific, the management server 100 acquires the electronic mail address of the administrator of the image forming apparatus 300a from the address book 133, and transmits, to the electronic mail address, an electronic mail notifying the setting change.

Note that, in FIG. 9, as an example of the information indicating that the infection risk is low, the information indicating that virus-spread prevention special measure has been lifted has been described, but the information indicating that the infection risk is low is not limited thereto. The information indicating that the infection risk is low may be, for example, information indicating that the number of virus-infected persons has been decreased, or information indicating that the number of virus-infected persons has become less than a predetermined number.

Figure 10:
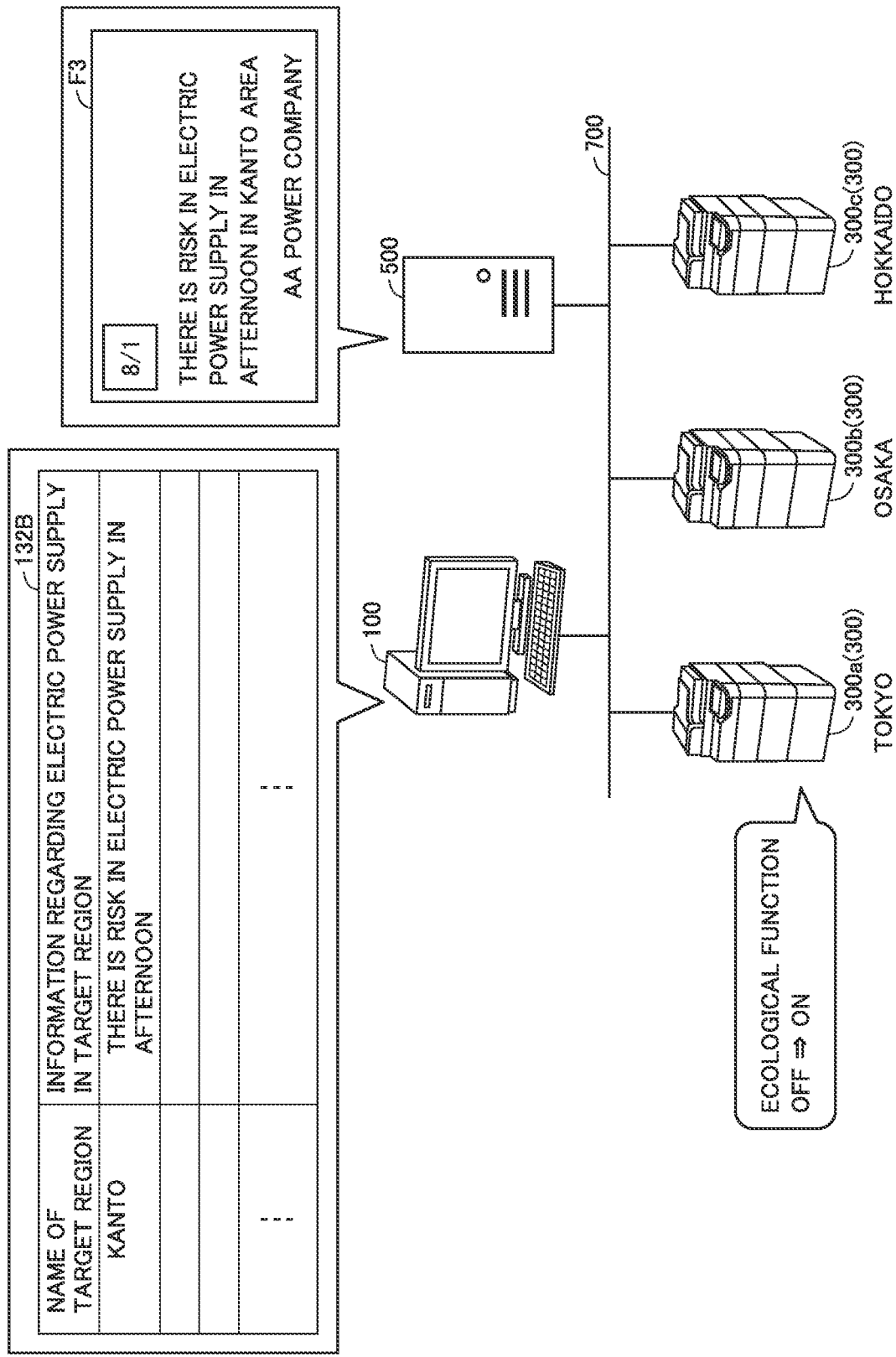
FIG. 10 is a diagram illustrating an example of the setting change processing performed by a management server when information regarding electric power supply is distributed from a distribution server.

FIG. 10 is a diagram illustrating an example of the setting change processing performed by the management server when the information regarding the electric power supply is distributed from the distribution server.

In the example illustrated in FIG. 10, the image forming apparatus 300a is installed in Tokyo, the image forming apparatus 300b is installed in Osaka, and the image forming apparatus 300c is installed in Hokkaido. Furthermore, in the example illustrated in FIG. 10, the ecological function of the image forming apparatus 300a is set to off. Further, provision information F3 indicates that there is a risk in electric power supply in afternoon in Kanto.

When the provision information F3 is distributed from the distribution server 500, the management server 100 receives the provision information F3 and searches in the provision information F3 using a predetermined search keyword. Thus, from the provision information F3, the management server 100 specifies "Kanto" as the first information and "there is a risk in electric power supply in afternoon" as the second information. Kanto is the name of a region including Tokyo and a plurality of prefectures near Tokyo. The information that there is a risk in the electric power supply in afternoon is an example of the information indicating that there is a risk in the electric power supply.

Next, the management server 100 updates the second table 132B based on the provision information F3. To be more specific, the management server 100 updates the "information regarding the electric power supply" in "Kanto" in the second table 132B to "there is a risk in the electric power supply in afternoon". Note that if a record of "Kanto" does not exist in the second table 132B, the management server 100 adds a record of "Kanto" and registers "there is a risk in the electric power supply in afternoon" in that record.

Next, the management server 100 acquires apparatus information 332 from each of the image forming apparatus 300a, the image forming apparatus 300b, and the image forming apparatus 300c, and specifies the installation place of each image forming apparatus.

Next, the management server 100 specifies, as the target image forming apparatus, the image forming apparatus 300a installed in the target region (i.e., Kanto) indicated by the provision information F3. Next, the management server 100 acquires a current setting for the ecological function of the image forming apparatus 300a.

Since the provision information F3 indicates that there is a risk in the electric power supply in afternoon in Kanto, it is preferable that the ecological function of an image forming apparatus installed in Kanto be set to on. However, the ecological function of the image forming apparatus 300a is set to off. That is, the current setting content of the image forming apparatus 300a is different from the setting content corresponding to the second information included in the provision information F3. Therefore, the management server 100 determines that it is necessary to change the setting of the ecological function of the image forming apparatus 300a.

The management server 100 outputs, to the image forming apparatus 300a, a change instruction for changing the ecological function to on. Thus, the ecological function of the image forming apparatus 300a is changed to on.

Next, the management server 100 notifies the administrator of the image forming apparatus 300a that the ecological function of the image forming apparatus 300a has been changed to on. As an example, the management server 100 acquires the electronic mail address of the administrator of the image forming apparatus 300a from the address book 133, and transmits, to the electronic mail address, an electronic mail notifying the setting change.

When a plurality of image forming apparatuses installed in the region where there is a risk in the electric power supply are installed on the same floor of the same company, the ecological function of only part of the plurality of image forming apparatuses may be turned on. In this case, the management server 100 determines, from the plurality of image forming apparatuses, an image forming apparatus whose ecological function is to be changed to on, and outputs, to the image forming apparatus, a change instruction for changing the ecological function to on.

Furthermore, the information indicating that there is a risk in the electric power supply may be information that a cooperation request for electric power consumption suppression has been issued, information that supply and demand of electric power are tight, or information that the consumption amount of electric power is likely to exceed the supply amount of electric power.

Figure 11:
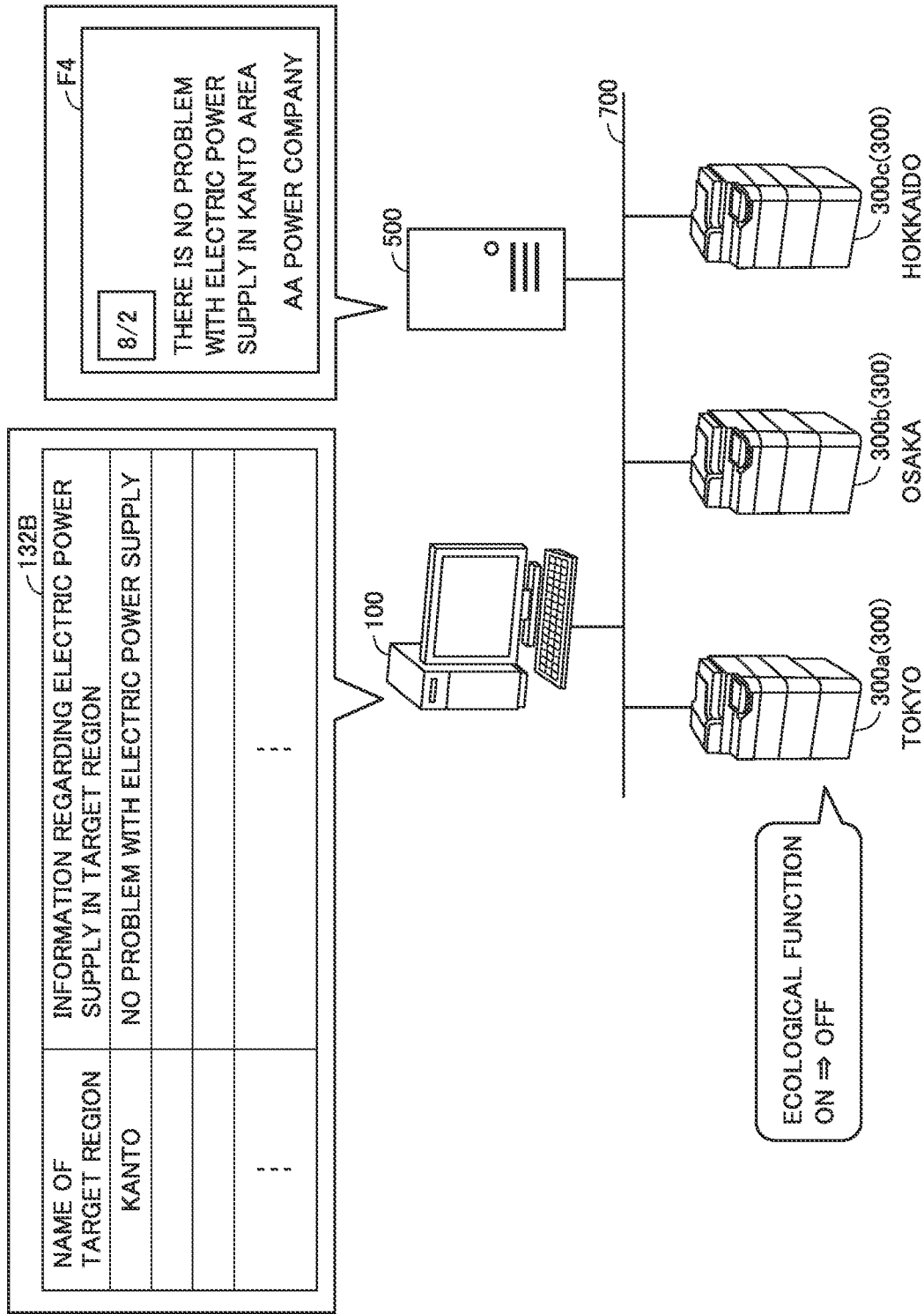
FIG. 11 is a diagram illustrating another example of the setting change processing performed by the management server when the information regarding the electric power supply is distributed from the distribution server.

FIG. 11 is a diagram illustrating another example of the setting change processing performed by the management server when the information regarding the electric power supply is distributed from the distribution server.

In the example shown in FIG. 11, the image forming apparatus 300a is installed in Tokyo, the image forming apparatus 300b is installed in Osaka, and the image forming apparatus 300c is installed in Hokkaido. Furthermore, in the example illustrated in FIG. 11, the ecological function of the image forming apparatus 300a is set to on. Further, provision information F4 indicates that there is no problem in the electric power supply in Kanto.

When the provision information F4 is distributed from the distribution server 500, the management server 100 receives the provision information F4 and searches in the provision information F4 using a predetermined search keyword. Thus, from the provision information F4, the management server 100 specifies "Kanto" as the first information and "no problem with electric power supply" as the second information. The information that there is no problem with the electric power supply is an example of information indicating that there is no risk in the electric power supply.

Next, the management server 100 acquires the apparatus information 332 from each of the image forming apparatus 300a, the image forming apparatus 300b, and the image forming apparatus 300c, and specifies the installation place of each image forming apparatus.

Next, the management server 100 specifies, as a target image forming apparatus, the image forming apparatus 300a installed in the target region (i.e., Kanto) indicated by the provision information F4. Next, the management server 100 acquires a current setting for the ecological function of the image forming apparatus 300a.

Since the provision information F4 indicates that there is no problem with the electric power supply in Kanto, it is preferable that the ecological function of the image forming apparatus installed in Kanto be set to off in favor of usability for user. However, the ecological function of the image forming apparatus 300a is set to on. That is, the current setting content of the image forming apparatus 300a is different from the setting content corresponding to the second information included in the provision information F4. Therefore, the management server 100 determines that it is necessary to change the setting of the ecological function of the image forming apparatus 300a.

The management server 100 outputs, to the image forming apparatus 300a, a change instruction for changing the ecological function to off. Thus, the ecological function of the image forming apparatus 300a is changed to off.

Next, the management server 100 notifies the administrator of the image forming apparatus 300a that the ecological function of the image forming apparatus 300a has been changed to off. As an example, the management server 100 acquires the electronic mail address of the administrator of the image forming apparatus 300*a* from the address book 133, and transmits, to the electronic mail address, an electronic mail notifying the setting change.

Note that the information indicating that there is no risk in the electric power supply may be information indicating that the cooperation request for electric power consumption suppression has been lifted, or information indicating that a supply amount exceeding a consumption amount of electric power is expected.

Figure 12:
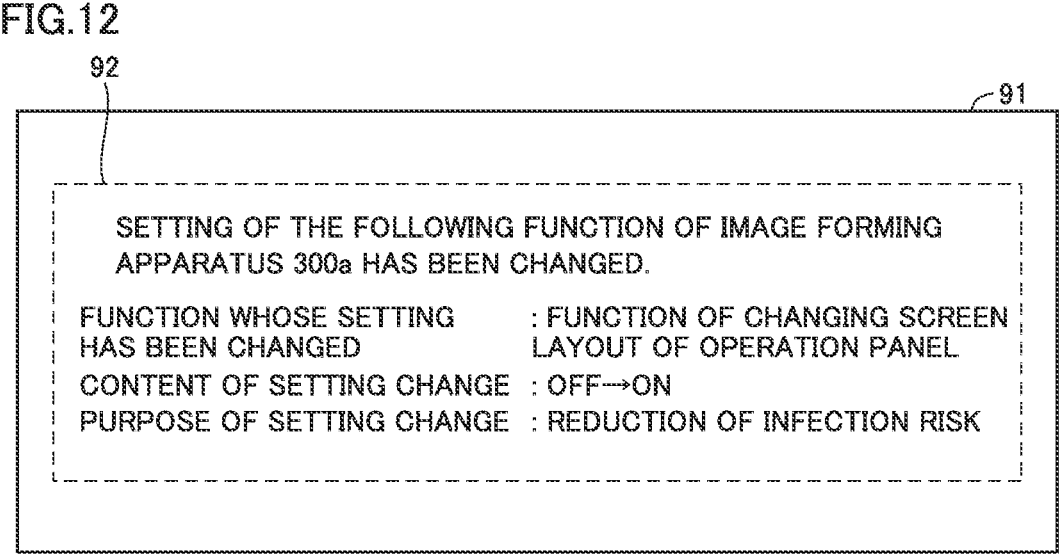
FIG. 12 is a diagram illustrating an example of a setting change notification.

FIG. 12 is a diagram illustrating an example of a setting change notification. The screen 91 is an example of a screen for an electronic mail transmitted from the management server 100 to the administrator of the image forming apparatus 300 whose setting has been changed. The screen 91 includes a message 92. The message 92 includes information indicating the image forming apparatus whose selling has been changed, information indicating the function whose setting has been changed, information indicating a content of the setting change of the function, and information indicating a purpose of the setting change.

In the example shown in FIG. 12, the image forming apparatus whose setting has been changed is the "image forming apparatus 300*a*", the function whose setting has been changed is the "function of changing the screen layout of the operation panel", the content of the setting change of the function is "from off to on", and the purpose of the setting change is "reduction of infection risk".

As illustrated in FIG. 12, when the setting of the image forming apparatus 300 has been changed, the management server 100 notifies the user that the setting of the image forming apparatus 300 has been changed. Therefore, when the setting of the image forming apparatus 300 is changed, it is possible to prevent the user from being confused.

Note that the message 92 may further include the content of the function in addition to the name of the function as the information indicating the function whose setting has been changed. Further, the notification method for the setting change may be a method of displaying the screen 91 on the operation panel 307 of the image forming apparatus 300 whose setting has been changed, instead of or in addition to the notification method by electronic mail. The setting change notification screen displayed on the operation panel 307 is provided from the management server 100 to the image forming apparatus 300. Alternatively, a plurality of screens may be stored in the image forming apparatus 300 as setting change notification screens, and the management server 100 may designate a screen to be displayed on the operation panel 307 from the plurality of screens.

Figure 13:
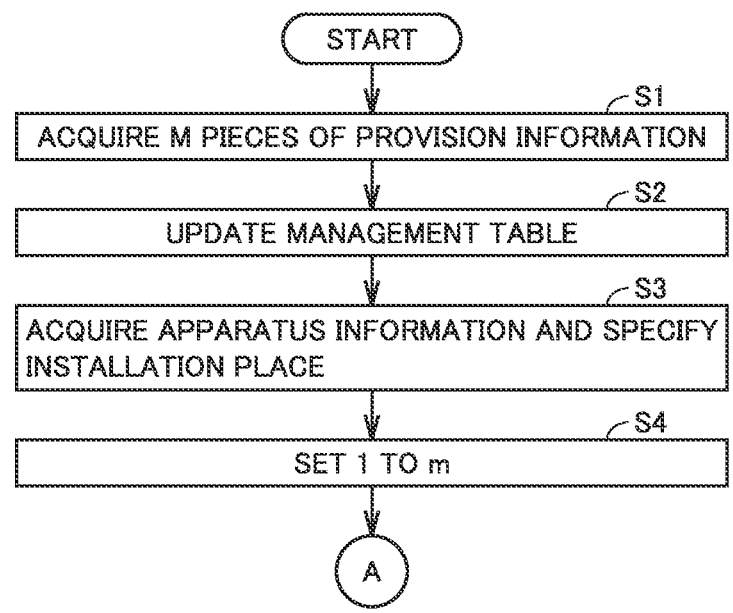
FIG. 13 is a flowchart showing processing from step S1 to step S4 in the setting change processing performed by the management server according to the first embodiment.
Figure 14:
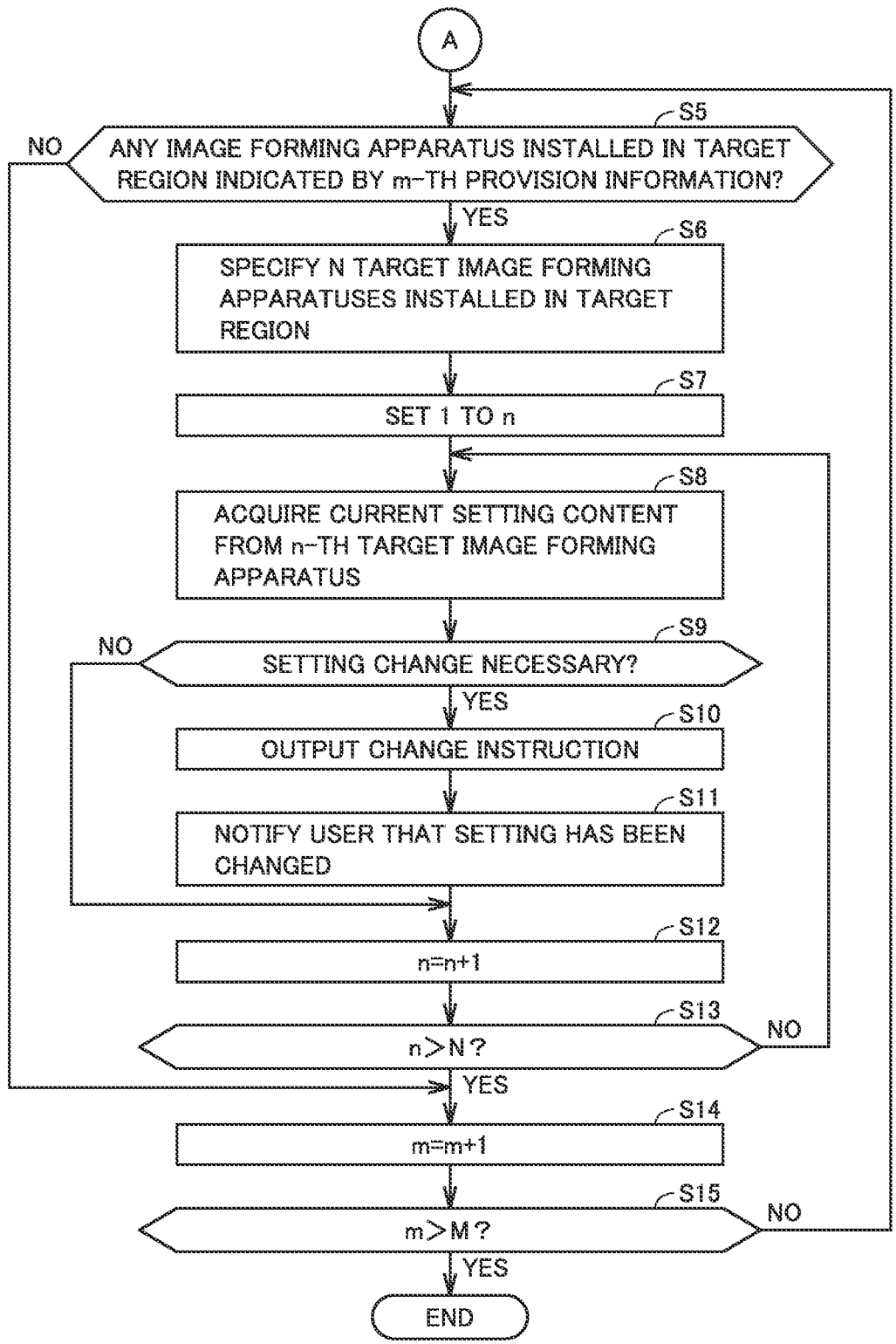
FIG. 14 is a flowchart showing processing after step S5 in the setting change processing performed by the management server according to the first embodiment.

A sequence of the setting change processing performed by the management server 100 will be described with reference to FIGS. 13 and 14. FIG. 13 is a flowchart showing the processing from step S1 to step S4 in the setting change processing performed by the management server according to the first embodiment. FIG. 14 is a flowchart showing the processing after step S5 in the setting change processing performed by the management server according to the first embodiment. The setting change processing is performed by the processor 101.

In step S1, the processor 101 acquires M pieces of provision information (M is an integer equal to or greater than 1). In step S2, the processor 101 specifies the first information and the second information from each provision information, and updates the management table 132 based on the first information and the second information.

In step S3, the processor 101 acquires apparatus information 332 from each of the one or more image forming apparatuses, and specifies the installation place of each of the one or more image forming apparatuses. In step S4, the processor 101 sets 1 to a variable m.

In step S5, the processor 101 determines, based on the installation place specified in step S3, whether or not there is an image forming apparatus installed in a target region indicated by the m-th provision information. When there is an image forming apparatus installed in the target region indicated by the m-th provision information (YES in step S5), the processor 101 advances the processing to step S6. On the other hand, when there is not an image forming apparatus installed in the target region indicated by the m-th provision information (NO in step S5), the processor 101 advances the processing to step S14.

In step S6, the processor 101 specifies N (N is an integer equal to or greater than 1) target image forming apparatuses installed in the target region indicated by the m-th provision information. More specifically, the processor 101 specifies, as the target image forming apparatus, an image forming apparatus whose installation place is included in the target region.

In step S7, the processor 101 sets 1 to a variable n. In step S8, the processor 101 acquires a current setting content from the n-th target image forming apparatus. More specifically, when the second information included in the m-th provision information is the information regarding the situation of spread of the infectious disease, the processor 101 acquires the current setting content of the infectious disease countermeasure function from the n-th target image forming apparatus. When the second information included in the m-th provision information is the information regarding the electric power supply, the processor 101 acquires the current setting content of the ecological function from the n-th target image forming apparatus.

In step S9, the processor 101 determines whether or not the setting change is necessary in the n-th target image forming apparatus. When the current setting content acquired in step S8 is different from the setting content corresponding to the second information included in the m-th provision information, the processor 101 determines that the setting change is necessary in the n-th target image forming apparatus.

More specifically, when the second information indicates that the infection risk is high and the infectious disease countermeasure function of the n-th target image forming apparatus is off, the processor 101 determines that the setting change is necessary in the n-th target image forming apparatus. When the second information indicates that the infection risk is low and the infectious disease countermeasure function of the n-th target image forming apparatus is on, the processor 101 determines that the setting change is necessary in the n-th target image forming apparatus. When the second information indicates that there is a risk in the electric power supply and the ecological function of the n-th target image forming apparatus is off, the processor 101 determines that the setting change is necessary in the n-th target image forming apparatus. When the second information indicates that there is no risk in the electric power supply and the ecological function of the n-th target image forming apparatus is on, the processor 101 determines that the setting change is necessary in the n-th target image forming apparatus.

When the setting change is necessary in the n-th target image forming apparatus (YES in step S9), the processor 101 advances the processing to step S10. On the other hand, when the setting change is not necessary in the n-th target image forming apparatus (NO in step S9), the processor 101 advances the processing to step S12.

In step S10, the processor 101 outputs a change instruction for changing the setting content of the setting item of the n-th target image forming apparatus to the setting content corresponding to the second information to the n-th target image forming apparatus.

In step S11, the processor 101 notifies the user that the setting of the n-th target image forming apparatus has been changed. In step S12, the processor 101 adds 1 to the variable n.

In step S13, the processor 101 determines whether or not the variable n is greater than N. When the variable n is larger than N (YES in step S13), the processor 101 advances the processing to step S14. On the other hand, when the variable n is equal to or less than N (NO in step S13), the processor 101 returns the processing to step S8.

In step S14, the processor 101 adds 1 to the variable m. In step S15, the processor 101 determines whether or not the variable m is greater than M. When the variable m is larger than M (YES in step S15), the processor 101 ends the setting change processing. On the other hand, when the variable m is equal to or less than M (NO in step S15), the processor 101 returns the processing to step S5.

As described above, the management server 100 acquires the first information indicating the target region and the second information indicating the situation of the target region. The second information includes at least one of the information regarding the situation of spread of the infectious disease and the information regarding the electric power supply. The management server 100 outputs to the target image forming apparatus a change instruction for changing the setting content of the setting item of the target image forming apparatus installed in the target region to the setting content corresponding to the second information.

Therefore, when the infection risk is high in the target region, the infectious disease countermeasure function of the target image forming apparatus installed in the target region is turned on. When the infection risk is low in the target region, the infectious disease countermeasure function of the target image forming apparatus installed in the target region is turned off. Therefore, it is possible to reduce time and effort for the user to change the setting of the image forming apparatus in accordance with the situation of spread of the infectious disease in the region.

Furthermore, when there is a risk in the electric power supply in the target region, the ecological function of the target image forming apparatus installed in the target region is turned on. When there is no risk in the electric power supply in the target region, the ecological function of the target image forming apparatus installed in the target region is turned off. Therefore, it is possible to reduce time and effort for the user to change the setting of the image forming apparatus in accordance with the situation of the electric power supply in the region.

Second Embodiment

In the first embodiment, the setting of the target image forming apparatus is changed without user permission. In contrast, in a second embodiment, when a permission of the user is obtained, the setting of the target image forming apparatus is changed. In the description of the second embodiment, the same configurations and elements as those of the first embodiment are denoted by the same reference numerals and the description thereof will not be repeated.

Figure 15:
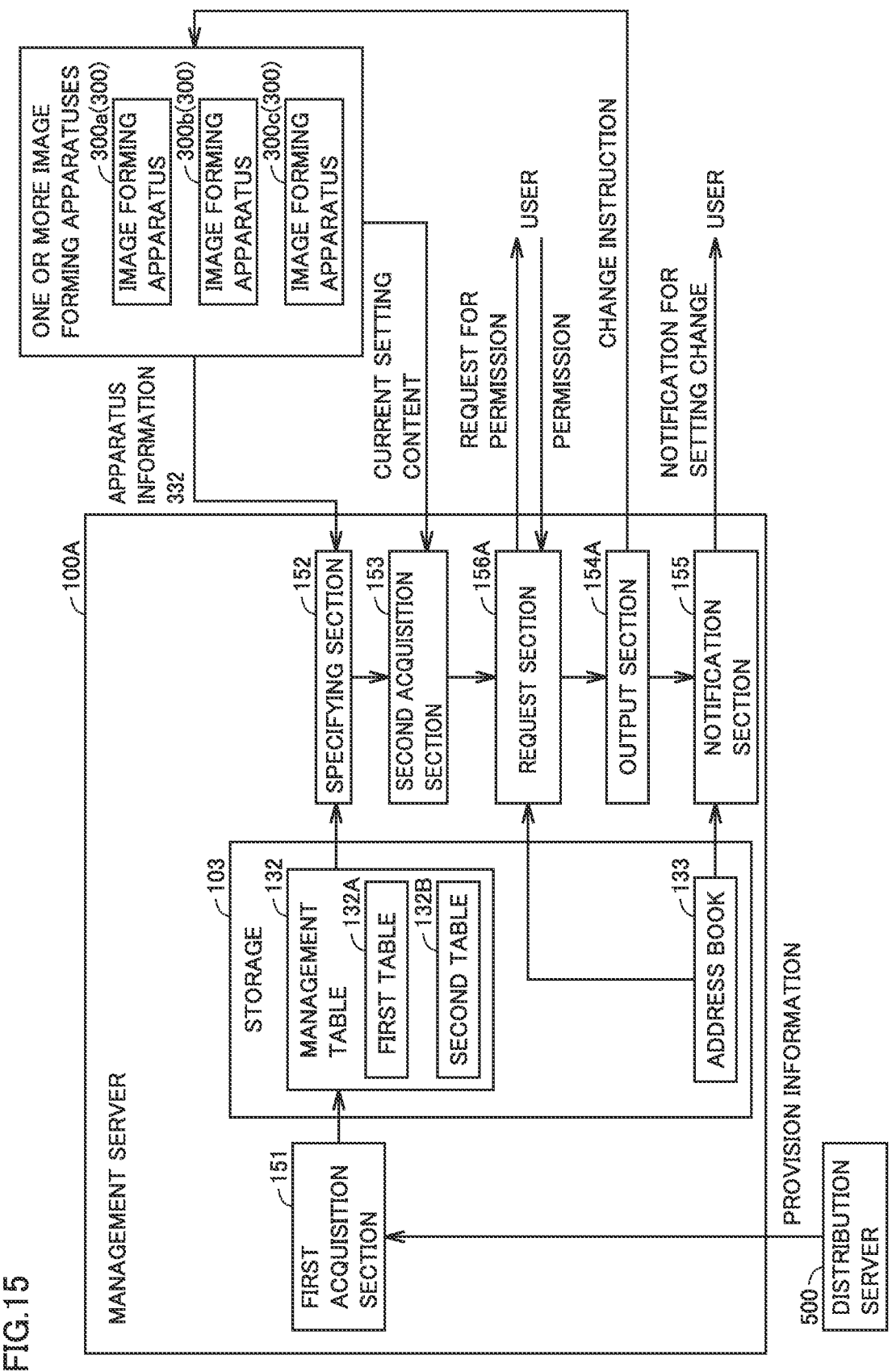
FIG. 15 is a diagram for explaining an overview of a setting change processing performed by a management server according to a second embodiment.

FIG. 15 is a diagram for explaining an overview of setting change processing performed by a management server according to the second embodiment. The management system according to the second embodiment includes a management server 100A, one or more image forming apparatuses, and a distribution server 500.

The hardware configuration of the management server 100A is similar to that of the management server 100. The management server 100A is different from the management server 100 in that the management server 100A includes a request section 156A and includes an output section 154A instead of the output section 154. The request section 156A and the output section 154A are realized by the processor 101 executing the program 131.

The request section 156A requests the user to permit the change of the current setting content of the setting item of the target image forming apparatus to the setting content corresponding to the second information.

More specifically, the request section 156A first acquires the electronic mail address of the administrator of the target image forming apparatus from the address book 133. Next, the request section 156A transmits, to the electronic mail address, an electronic mail for requesting a permission to change the setting of the target image forming apparatus.

Figure 16:
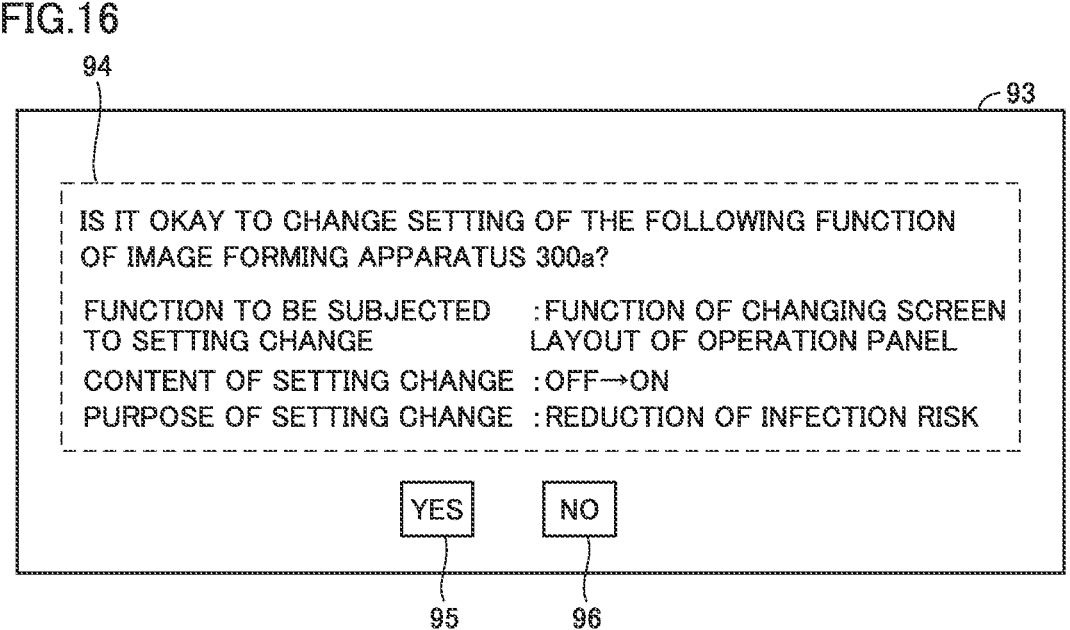
FIG. 16 is a diagram illustrating an example of a notification for requesting a user for a permission.

Referring now to FIG. 16, an example of a notification for requesting the user for the permission will be described. FIG. 16 is a diagram illustrating an example of the notification for requesting the user for the permission. A screen 93 is an example of a screen for the electronic mail sent from the management server 100A to the administrator of the image forming apparatus 300 for which a setting change is expected. The screen 93 includes a message 94, a button 95, and a button 96. The message 94 includes information indicating the image forming apparatus for which the setting change is expected, information indicating the function to be subjected to the setting change, information indicating a content of the setting change, and information indicating a purpose of the setting change.

In the example shown in FIG. 16, the image forming apparatus for which the setting change is expected is the "image forming apparatus 300*a*", the function to be subjected to the setting change is the "function of changing the screen layout of the operation panel", the content of the setting change of the function is "from off to on", and the purpose of the setting change is "reduction of infection risk".

Button 95 is an element for inputting an instruction to permit the setting change of the target image forming apparatus for which the setting change is expected. Button 96 is an element for inputting an instruction to prohibit the setting change of the target image forming apparatus for which the setting change is expected.

The message 94 may further include the content of the function in addition to the name of the function as the information indicating the function to be subjected to the setting change. Further, the method of requesting the user for the permission may be a method of displaying the screen 93 on the operation panel 307 of the image forming apparatus 300 for which the setting change is expected, instead of or in addition to the notification by electronic mail. The notification screen to be displayed on the operation panel 307 is provided from the management server 100A to the image forming apparatus 300. Alternatively, a plurality of screens may be stored in advance in the image forming apparatus 300 as notification screens, and the management server 100A may designate a screen to be displayed on the operation panel 307 from the plurality of screens.

Referring to FIG. 15 again, when the button 95 is pressed, the request section 156A determines that the setting change of the target image forming apparatus has been permitted, and when button 96 is pressed, the request section 156A determines that the setting change of the target image forming apparatus has not been permitted.

When the change of the setting content of the setting item of the target image forming apparatus to the setting content corresponding to the second information is permitted, the output section 154A outputs, to the target image forming apparatus, a change instruction for changing the setting content of the setting item to the setting content corresponding to the second information.

A sequence of the setting change processing performed by the management server 100A will be described with reference to FIG. 17. FIG. 17 is a flowchart illustrating the sequence of the setting change processing performed by the management server according to the second embodiment. The setting change processing is performed by the processor 101. In the setting change processing performed by the management server 100A, steps S9A and S9B are added to the setting change processing performed by the management server 100. Note that in the processing illustrated in FIG. 17, the same processing as the processing illustrated in FIG. 13 or 14 will be denoted by the same step numbers and description thereof will not be repeated.

When the setting change is necessary in the n-th target image forming apparatus (YES in step S9), the processor 101 advances the processing to step S9A. In step S9A, the processor 101 requests the user to permit the setting content of the setting item of the n-th target image forming apparatus to be changed to the setting content corresponding to the second information. In one example, the processor 101 sends an electronic mail requesting the administrator of the n-th target image forming apparatus to permit the setting change. As another example, the processor 101 instructs the n-th target image forming apparatus to display, on the operation panel 307, a screen for requesting to permit the setting change.

In step S9B, the processor 101 determines whether or not the setting change in the n-th target image forming apparatus is permitted. When the setting change in the n-th target image forming apparatus is permitted (YES in step S9B), the processor 101 advances the processing to step S10. On the other hand, when the selling change in the n-th target image forming apparatus is not permitted (NO in step S9B), the processor 101 advances the processing to step S12.

As described above, in the second embodiment, when the setting change of the target image forming apparatus is permitted, the management server 100A outputs, to the target image forming apparatus, a change instruction instructing to change the setting. Therefore, it is possible to prevent the setting of the image forming apparatus from being changed against the user's intention.

Modification Example

Next, modification examples applied to the first and second embodiments will be described.

First Modification Example

In the above description, the first acquisition section 151 specifies the first information and the second information by analyzing the provision information provided from at least one of the municipality and the company. However, the method of acquiring the first information and the second information by the first acquisition section 151 is not limited thereto.

As another example, the first acquisition section 151 may periodically access a predetermined web page and analyze the predetermined web page to specify the first information and the second information. The predetermined web page may be, for example, a home page of a municipality or a home page of a power company. A uniform resource locator (URL) of the predetermined web page is stored in the storage 103 in advance.

As another example, the first acquisition section 151 may acquire the first information and the second information from a server that stores the first information and the second information. For example, when at least one of the municipality and the company collects the first information and the second information and stores the first information and the second information in a predetermined server for the user of the management system and the user of the management system can download the first information and the second information from the predetermined server, the first acquisition section 151 may download the first information and the second information from the predetermined server. Further, when at least one of the municipality and the company collects the first information and the second information and stores the first information and the second information in a predetermined server for the user of the management system and periodically distributes the first information and the second information to the user of the management system, the first acquisition section 151 may receive the distributed first information and second information.

As another example, the first acquisition section 151 may receive the first information and the second information input by the user to the management server 100, 100A.

Second Modification Example

In the above description, the specifying section 152 acquires apparatus information 332 from each image forming apparatus and specifies the target image forming apparatus. However, the method for specifying the target image forming apparatus by the specifying section 152 is not limited to this.

As another example, information indicating an installation place of each image forming apparatus may be stored in the storage 103 in advance. In such a case, the specifying section 152 specifies the target image forming apparatus based on the information stored in the storage 103 and indicating the installation place of each image forming apparatus.

As another example, if the management server 100, 100A is a server for managing an image forming apparatus installed in a specific region, the specifying section 152 may specify a target image forming apparatus based on a management zone for the management server 100, 100A. More specifically, when the management zone for the management server 100, 100A is included in the target region, the specifying section 152 specifies, as the target image forming apparatus, an image forming apparatus managed by the management server 100, 100A.

Third Modification Example

In the above description, when the infection risk is decreased, the infectious disease countermeasure function is changed from on to off. Furthermore, when the risk in the electric power supply is eliminated, the ecological function is changed from on to off. However, even when the infection risk is decreased, the infectious disease countermeasure function may be kept to be on. Further, even when the risk in the electric power supply is eliminated, the ecological function may be kept to be on.

Fourth Modification Example

In the above description, the image forming apparatus 300 has the infectious disease countermeasure function and the ecological function. However, the image forming apparatus 300 may include any one of the infectious disease countermeasure function and the ecological function. When the image forming apparatus 300 has the infectious disease countermeasure function and does not have the ecological function, the management server 100, 100A acquires the information regarding the situation of spread of the infectious disease, and based on the information, outputs to the target image forming apparatus a change instruction instructing the setting change of the infectious disease countermeasure function of the target image forming apparatus. Further, when the image forming apparatus 300 has the ecological function and does not have the infectious disease countermeasure function, the management server 100, 100A acquires the information regarding the electric power supply, and based on the information, outputs, to the target image forming apparatus, a change instruction instructing the setting change of the ecological function of the target image forming apparatus.

Fifth Modification Example

In the above description, when the setting of the image forming apparatus 300 has been changed, the management server 100, 100A has notified the user that the setting of the image forming apparatus 300 has been changed. However, the management server 100, 100A may not notify the user that the setting of the image forming apparatus 300 has been changed.

[Supplementary Note]

The above-described embodiments and modification examples include the following technical ideas.

[Configuration 1]

A management method for managing one or more image forming apparatuses, the management method comprising:
acquiring first information indicating a target region and second information indicating a situation of the target region;
specifying a target image forming apparatus installed in the target region in the one or more image forming apparatuses; and
outputting, to the target image forming apparatus, a change instruction for changing a setting content of a setting item of the target image forming apparatus to a setting content corresponding to the second information, wherein
the second information includes at least one of information regarding a situation of spread of an infectious disease and information regarding electric power supply.

[Configuration 2]

The management method according to configuration 1, wherein the target region includes at least one of a range including a plurality of countries, a country, a prefecture, an area, a city, town or village, an electric-power-supply-unit-based region, and a school-district-based region.

[Configuration 3]

The management method according to configuration 1 or 2, wherein
the acquiring the first information and the second information includes at least one of
specifying the first information and the second information by analyzing provision information provided from at least one of a municipality and a company,
specifying the first information and the second information by analyzing a predetermined web page,
acquiring the first information and the second information from a server that stores the first information and the second information, and
receiving the first information and the second information each input by a user.

[Configuration 4]

The management method according to any one of configurations 1 to 3, wherein
the specifying the target image forming apparatus includes specifying the target image forming apparatus based on apparatus information of the one or more image forming apparatuses, and the apparatus information includes at least one of destination information of the one or more image forming apparatuses, place information indicating an installation place of each of the one or more image forming apparatuses, network information of the one or more image forming apparatuses, and physical location information of the one or more image forming apparatuses.

[Configuration 5]

The management method according to any one of configurations 1 to 3, wherein the specifying the target image forming apparatus includes specifying the target image forming apparatus based on a management zone for a management server that performs the management method.

[Configuration 6]

The management method according to any one of configurations 1 to 5, wherein
when the second information is the information regarding the situation of spread of the infectious disease, the setting item is an item regarding an infectious disease countermeasure function for reducing an infection risk, and
when the second information is the information regarding the electric power supply, the setting item is an item regarding an ecological function for reducing electric power consumption.

[Configuration 7]

The management method according to configuration 6, wherein the infectious disease countermeasure function includes at least one of a function of changing a screen layout of an operation panel, a function of notifying the infection risk, a function of outputting a waste sheet, and an authentication function.

[Configuration 8]

The management method according to any one of configurations 1 to 7, further comprising notifying a user that the setting content of the setting item of the target image forming apparatus has been changed to the setting content corresponding to the second information.

[Configuration 9]

The management method according to any one of configurations 1 to 8, further comprising requesting a user for a permission to change the setting content of the setting item of the target image forming apparatus to the setting content corresponding to the second information, wherein
the outputting the change instruction includes outputting the change instruction to the target image forming apparatus when it is permitted to change the setting content of the setting item of the target image forming apparatus to the setting content corresponding to the second information.

[Configuration 10]

The management method according to any one of configurations 1 to 9, further comprising acquiring a current setting content of the setting item from the target image forming apparatus, wherein
- the outputting the change instruction includes outputting the change instruction to the target image forming apparatus when the current setting content is different from the setting content corresponding to the second information.

[Configuration 11]

A management server for managing one or more image forming apparatuses, the management server comprising:
- a storage that stores a plurality of instructions; and
- a processor that executes the plurality of instructions, wherein
- when executed by the processor, the plurality of instructions cause the processor to perform:
  - acquiring first information indicating a target region and second information indicating a situation of the target region;
  - specifying a target image forming apparatus installed in the target region in the one or more image forming apparatuses; and
  - outputting, to the target image forming apparatus, a change instruction for changing a setting content of a setting item of the target image forming apparatus to a setting content corresponding to the second information, and
- the second information includes at least one of information regarding a situation of spread of an infectious disease and information regarding electric power supply.

[Configuration 12]

The management server according to configuration 11, wherein the target region includes at least one of a range including a plurality of countries, a country, a prefecture, an area, a city, town or village, an electric-power-supply-unit-based region, and a school-district-based region.

[Configuration 13]

The management server according to configuration 11 or 12, wherein
- the acquiring the first information and the second information includes at least one of
  - specifying the first information and the second information by analyzing provision information provided from at least one of a municipality and a company,
  - specifying the first information and the second information by analyzing a predetermined web page,
  - acquiring the first information and the second information from a server that stores the first information and the second information, and
  - receiving the first information and the second information each input by a user.

[Configuration 14]

The management server according to any one of configurations 11 to 13, wherein
- the specifying the target image forming apparatus includes specifying the target image forming apparatus based on apparatus information of the one or more image forming apparatuses, and
- the apparatus information includes at least one of destination information of the one or more image forming apparatuses, place information indicating an installation place of each of the one or more image forming apparatuses, network information of the one or more image forming apparatuses, and physical location information of the one or more image forming apparatuses.

[Configuration 15]

The management server according to any one of configurations 11 to 13, wherein the specifying the target image forming apparatus includes specifying the target image forming apparatus based on a management zone for the management server.

[Configuration 16]

The management server according to any one of configurations 11 to 15, wherein
- when the second information is the information regarding the situation of spread of the infectious disease, the setting item is an item regarding an infectious disease countermeasure function for reducing an infection risk, and
- when the second information is the information regarding the electric power supply, the setting item is an item regarding an ecological function for reducing electric power consumption.

[Configuration 17]

The management server according to configuration 16, wherein the infectious disease countermeasure function includes at least one of a function of changing a screen layout of an operation panel, a function of notifying the infection risk, a function of outputting a waste sheet, and an authentication function.

[Configuration 18]

The management server according to any one of configurations 11 to 17, wherein when executed by the processor, the plurality of instructions further cause the processor to perform notifying a user that the setting content of the setting item of the target image forming apparatus has been changed to the setting content corresponding to the second information.

[Configuration 19]

The management server according to any one of configurations 11 to 18, wherein
- when executed by the processor, the plurality of instructions further cause the processor to perform requesting a user for a permission to change the setting content of the setting item of the target image forming apparatus to the setting content corresponding to the second information, and
- the outputting the change instruction includes outputting the change instruction to the target image forming apparatus when it is permitted to change the setting content of the setting item of the target image forming apparatus to the setting content corresponding to the second information.

[Configuration 20]

The management server according to any one of configurations 11 to 19, wherein
- when executed by the processor, the plurality of instructions further cause the processor to perform acquiring a current setting content of the setting item from the target image forming apparatus, and
- the outputting the change instruction includes outputting the change instruction to the target image forming apparatus when the current setting content is different from the setting content corresponding to the second information.

Although embodiments of the present invention have been described and illustrated in detail, the disclosed embodiments are made for purposes of illustration and example only and not limitation. The scope of the present invention should be interpreted by terms of the appended claims.

What is claimed is:

1. A management method for managing one or more image forming apparatuses, the management method comprising:
   acquiring first information indicating a target region and second information indicating a situation of the target region;
   specifying a target image forming apparatus installed in the target region in the one or more image forming apparatuses; and
   outputting, to the target image forming apparatus, a change instruction for changing a setting content of a setting item of the target image forming apparatus to a setting content corresponding to the second information, wherein
   the second information includes at least one of information regarding a situation of spread of an infectious disease and information regarding electric power supply, the information regarding electric power supply being whether or not there is a risk of a shortage of electric power for the target region.

2. The management method according to claim 1, wherein the target region includes at least one of a range including a plurality of countries, a country, a prefecture, an area, a city, town or village, an electric-power-supply-unit-based region, and a school-district-based region.

3. The management method according to claim 1, wherein the acquiring the first information and the second information includes at least one of
   specifying the first information and the second information by analyzing provision information provided from at least one of a municipality and a company,
   specifying the first information and the second information by analyzing a predetermined web page,
   acquiring the first information and the second information from a server that stores the first information and the second information, and
   receiving the first information and the second information each input by a user.

4. The management method according to claim 1, wherein
   the specifying the target image forming apparatus includes specifying the target image forming apparatus based on apparatus information of the one or more image forming apparatuses, and
   the apparatus information includes at least one of destination information of the one or more image forming apparatuses, place information indicating an installation place of each of the one or more image forming apparatuses, network information of the one or more image forming apparatuses, and physical location information of the one or more image forming apparatuses.

5. The management method according to claim 1, wherein the specifying the target image forming apparatus includes specifying the target image forming apparatus based on a management zone for a management server that performs the management method.

6. The management method according to claim 1, wherein when the second information is the information regarding the situation of spread of the infectious disease, the setting item is an item regarding an infectious disease countermeasure function for reducing an infection risk, and
   when the second information is the information regarding the electric power supply, the setting item is an item regarding an ecological function for reducing electric power consumption.

7. The management method according to claim 6, wherein the infectious disease countermeasure function includes at least one of a function of changing a screen layout of an operation panel, a function of notifying the infection risk, a function of outputting a waste sheet, and an authentication function.

8. The management method according to claim 1, further comprising:
   notifying a user that the setting content of the setting item of the target image forming apparatus has been changed to the setting content corresponding to the second information.

9. The management method according to claim 1, further comprising requesting a user for a permission to change the setting content of the setting item of the target image forming apparatus to the setting content corresponding to the second information, wherein
   the outputting the change instruction includes outputting the change instruction to the target image forming apparatus when it is permitted to change the setting content of the setting item of the target image forming apparatus to the setting content corresponding to the second information.

10. The management method according to claim 1, further comprising:
    acquiring a current setting content of the setting item from the target image forming apparatus, wherein
    the outputting the change instruction includes outputting the change instruction to the target image forming apparatus when the current setting content is different from the setting content corresponding to the second information.

11. A management server for managing one or more image forming apparatuses, the management server comprising:
    a storage that stores a plurality of instructions; and
    a processor that executes the plurality of instructions, wherein
    when executed by the processor, the plurality of instructions cause the processor to perform:
    acquiring first information indicating a target region and second information indicating a situation of the target region;
    specifying a target image forming apparatus installed in the target region in the one or more image forming apparatuses; and
    outputting, to the target image forming apparatus, a change instruction for changing a setting content of a setting item of the target image forming apparatus to a setting content corresponding to the second information, and
    the second information includes at least one of information regarding a situation of spread of an infectious disease and information regarding electric power supply, the information regarding electric power supply including being whether or not there is a risk of a shortage of electric power for the target region.

12. The management server according to claim 11, wherein the target region includes at least one of a range including a plurality of countries, a country, a prefecture, an area, a city, town or village, an electric-power-supply-unit-based region, and a school-district-based region.

13. The management server according to claim 11, wherein
the acquiring the first information and the second information includes at least one of
specifying the first information and the second information by analyzing provision information provided from at least one of a municipality and a company,
specifying the first information and the second information by analyzing a predetermined web page,
acquiring the first information and the second information from a server that stores the first information and the second information, and
receiving the first information and the second information each input by a user.

14. The management server according to claim 11, wherein
the specifying the target image forming apparatus includes specifying the target image forming apparatus based on apparatus information of the one or more image forming apparatuses, and
the apparatus information includes at least one of destination information of the one or more image forming apparatuses, place information indicating an installation place of each of the one or more image forming apparatuses, network information of the one or more image forming apparatuses, and physical location information of the one or more image forming apparatuses.

15. The management server according to claim 11, wherein the specifying the target image forming apparatus includes specifying the target image forming apparatus based on a management zone for the management server.

16. The management server according to claim 11, wherein
when the second information is the information regarding the situation of spread of the infectious disease, the setting item is an item regarding an infectious disease countermeasure function for reducing an infection risk, and
when the second information is the information regarding the electric power supply, the setting item is an item regarding an ecological function for reducing electric power consumption.

17. The management server according to claim 16, wherein the infectious disease countermeasure function includes at least one of a function of changing a screen layout of an operation panel, a function of notifying the infection risk, a function of outputting a waste sheet, and an authentication function.

18. The management server according to claim 11, wherein when executed by the processor, the plurality of instructions further cause the processor to perform notifying a user that the setting content of the setting item of the target image forming apparatus has been changed to the setting content corresponding to the second information.

19. The management server according to claim 11, wherein
when executed by the processor, the plurality of instructions further cause the processor to perform requesting a user for a permission to change the setting content of the setting item of the target image forming apparatus to the setting content corresponding to the second information, and
the outputting the change instruction includes outputting the change instruction to the target image forming apparatus when it is permitted to change the setting content of the setting item of the target image forming apparatus to the setting content corresponding to the second information.

20. The management server according to claim 11, wherein
when executed by the processor, the plurality of instructions further cause the processor to perform acquiring a current setting content of the setting item from the target image forming apparatus, and
the outputting the change instruction includes outputting the change instruction to the target image forming apparatus when the current setting content is different from the setting content corresponding to the second information.

* * * * *